(12) United States Patent
Zhao et al.

(10) Patent No.: US 10,866,450 B2
(45) Date of Patent: Dec. 15, 2020

(54) LIQUID CRYSTAL DISPLAY PANELS AND LIQUID CRYSTAL DISPLAY DEVICES

(71) Applicants: Shanghai Tianma Micro-electronics Co., Ltd., Shanghai (CN); Chengdu Tianma Micro-Electronics Co., Ltd., Chengdu (CN)

(72) Inventors: Jian Zhao, Shanghai (CN); Feng Qin, Shanghai (CN); Ling Shen, Shanghai (CN); Zhidan Su, Shanghai (CN)

(73) Assignees: SHANGHAI TIANMA MICRO-ELECTRONICS CO., LTD., Shanghai (CN); CHENGDU TIANMA MICRO-ELECTRONICS CO., LTD., Chengdu (CN)

( * ) Notice: Subject to any disclaimer, the term of this patent is extended or adjusted under 35 U.S.C. 154(b) by 0 days.

(21) Appl. No.: 16/360,627

(22) Filed: Mar. 21, 2019

(65) Prior Publication Data
US 2020/0201109 A1    Jun. 25, 2020

(30) Foreign Application Priority Data
Dec. 19, 2018  (CN) .......................... 2018 1 1551933

(51) Int. Cl.
*G02F 1/1333*  (2006.01)
*G02F 1/1343*  (2006.01)
(Continued)

(52) U.S. Cl.
CPC ....... *G02F 1/133382* (2013.01); *G01K 1/026* (2013.01); *G01K 7/16* (2013.01);
(Continued)

(58) Field of Classification Search
CPC ......... G02F 1/133382; G02F 1/133512; G02F 1/134309; G02F 1/13452; G02F 1/136286;
(Continued)

(56) References Cited

U.S. PATENT DOCUMENTS

2007/0012897 A1   1/2007  Lee et al.
2008/0246903 A1*  10/2008  Park ...................... G01K 13/00
                                                              349/72
2009/0102774 A1   4/2009  Hattori

FOREIGN PATENT DOCUMENTS

CN         205594258 U      9/2016
CN         108761930 A     11/2018
(Continued)

*Primary Examiner* — Thoi V Duong
(74) *Attorney, Agent, or Firm* — Anova Law Group PLLC

(57) ABSTRACT

Liquid crystal display panel and liquid crystal display device are provided. A liquid crystal display panel includes a first substrate, a second substrate, and a liquid crystal layer there-between. The first substrate includes a first base substrate, and gate lines and data lines, on the first base substrate and defining a plurality of sub-pixels. The second substrate includes a second base substrate. At least one heating sensor is disposed between the first and second base substrates. A non-display area includes a first non-display area, disposed around a display area, and a second non-display area, disposed around the first non-display area. Each heating sensor includes at least one sub-sensor and two sensor terminals, including a first and second sensor terminal, respectively connected to two ends of the at least one sub-sensor. At least one of the at least one sub-sensor is disposed in the first non-display area.

20 Claims, 25 Drawing Sheets

(51) Int. Cl.
  *G01K 1/02* (2006.01)
  *G01K 7/16* (2006.01)
  *G02F 1/1335* (2006.01)
  *G02F 1/1345* (2006.01)
  *G02F 1/1362* (2006.01)

(52) U.S. Cl.
  CPC .... *G02F 1/13452* (2013.01); *G02F 1/133512* (2013.01); *G02F 1/134309* (2013.01); *G02F 1/136286* (2013.01); *G02F 2001/134345* (2013.01); *G02F 2201/121* (2013.01)

(58) Field of Classification Search
  CPC ............... G02F 1/132; G02F 1/133345; G02F 2201/42; G02F 2201/121; G02F 2001/133388; G02F 2001/134345; G01K 7/16; G01K 1/026
  See application file for complete search history.

(56) References Cited

FOREIGN PATENT DOCUMENTS

| | | |
|---|---|---|
| JP | 2010039247 A | 2/2010 |
| KR | 20040057715 A | 7/2004 |

\* cited by examiner

LIQUID CRYSTAL DISPLAY PANELS AND LIQUID CRYSTAL DISPLAY DEVICES

CROSS-REFERENCES TO RELATED APPLICATIONS

This application claims priority of Chinese Patent Application No. 201811551933.4, filed on Dec. 19, 2018, the entire contents of which are hereby incorporated by reference.

FIELD OF THE INVENTION

The present disclosure generally relates to the field of display technologies and, more particularly, relates to a liquid crystal display panel and a liquid crystal display device.

BACKGROUND

A liquid crystal display device may normally display images at a normal temperature. However, a liquid crystal display device for applications in a special working environment, e.g., for use in military or vehicle display, may be used in a temperature range of approximately −50° C. to 70° C. Since a viscosity coefficient of a liquid crystal material may increase at a low temperature, a threshold voltage may rise, and a response speed may become slow, and further, a liquid crystal crystallization may occur. Thus the liquid crystal display device may not operate normally. To ensure that a liquid crystal display device used in such a special low-temperature environment can be started and operate normally, heating measures are needed. However, problems arise when heating measures are taken. In one case, a liquid crystal display device may be heated to a temperature exceeding a temperature required for the liquid crystal display device to be started and operate normally, resulting in unnecessary waste of power. In another case, a liquid crystal display device may not be heated to a temperature required for the liquid crystal display device to be started and operate normally. Accordingly, a problem of how to accurately monitor an internal temperature of a liquid crystal display panel in real time so that a heating device may be started and stay idle accordingly needs to be solved.

The disclosed methods and structures are directed to solve one or more problems set forth above and other problems in the art.

SUMMARY

One aspect of the present disclosure includes a liquid crystal display panel. The liquid crystal display panel includes a first substrate. The first substrate includes a first base substrate, and gate lines and data lines sequentially disposed on the first base substrate. The gate lines extend along a first direction and arranged along a second direction, and the data lines extend along the second direction and arranged along the first direction. The first direction is perpendicular to the second direction, and the gate lines intersect with and insulated from the data lines, thereby defining a plurality of sub-pixels. The liquid crystal display panel also includes a second substrate including a second base substrate, and a liquid crystal layer located between the first substrate and the second substrate. The liquid crystal display panel also includes at least one heating sensor disposed between the first base substrate and the second base substrate. The liquid crystal display panel includes a display area and a non-display area disposed around the display area. The non-display area includes a first non-display area and a second non-display area. The first non-display area is disposed around the display area, and the second non-display area is disposed around the first non-display area. Each of the at least one heating sensor includes at least one sub-sensor and two sensor terminals, and the two sensor terminals includes a first sensor terminal and a second sensor terminal. The first sensor terminal and the second sensor terminal are respectively connected to two ends of the at least one sub-sensor; and at least one of the at least one sub-sensor is disposed in the first non-display area.

Another aspect of the present disclosure includes a liquid crystal display device. The liquid crystal display device includes a liquid crystal display panel including a first substrate. The first substrate includes a first base substrate, and gate lines and data lines sequentially disposed on the first base substrate. The gate lines extend along a first direction and arranged along a second direction, and the data lines extend along the second direction and arranged along the first direction. The first direction is perpendicular to the second direction, and the gate lines intersect with and insulated from the data lines, thereby defining a plurality of sub-pixels. The liquid crystal display panel also includes a second substrate including a second base substrate, and a liquid crystal layer located between the first substrate and the second substrate. The liquid crystal display panel also includes at least one heating sensor disposed between the first base substrate and the second base substrate. The liquid crystal display panel includes a display area and a non-display area disposed around the display area. The non-display area includes a first non-display area and a second non-display area. The first non-display area is disposed around the display area, and the second non-display area is disposed around the first non-display area. Each of the at least one heating sensor includes at least one sub-sensor and two sensor terminals, and the two sensor terminals includes a first sensor terminal and a second sensor terminal. The first sensor terminal and the second sensor terminal are respectively connected to two ends of the at least one sub-sensor; and at least one of the at least one sub-sensor is disposed in the first non-display area.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the present invention, which are illustrated in the accompanying drawings. Wherever possible, the same reference numbers will be used throughout the drawings to refer to the same or like parts.

An exemplary liquid crystal display panel provided by the present disclosure includes a first substrate and an oppositely disposed second substrate. Heating sensors and heating electrodes may be disposed on a surface of the first substrate facing the second substrate. That is, the heating sensors and the heating electrodes may be disposed inside the liquid crystal display panel. Heat generated by the heating electrodes may directly act on liquid crystal molecules of a liquid crystal layer in a liquid crystal box. Accordingly, the liquid crystal display panel may be quickly started in a low temperature environment. The heating sensors may monitor temperatures inside the liquid crystal box in real time, so that the heating electrodes may be started and suspended accordingly.

Figure 1:
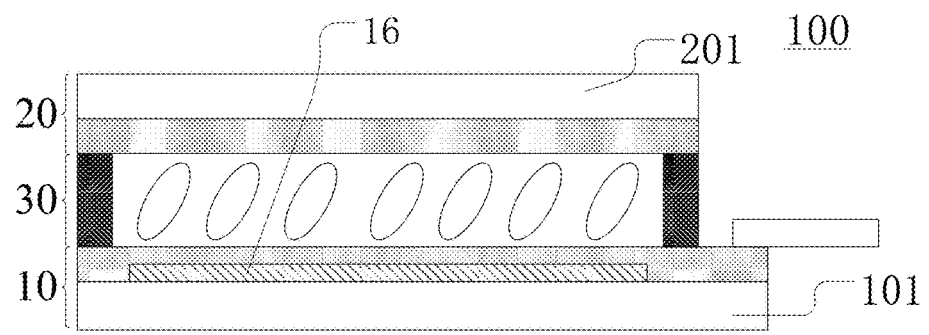
FIG. 1 illustrates a schematic structural diagram of a liquid crystal display panel consistent with the disclosed embodiments.

FIG. 1 illustrates an exemplary liquid crystal display panel consistent with the disclosed embodiments. As shown in FIG. 1, the liquid crystal display panel 100 includes a first substrate 10 and an oppositely disposed second substrate 20. The first substrate 10 includes a first base substrate 101, and the second substrate includes a second base substrate 201. The liquid crystal display panel 100 also includes a liquid crystal layer 30. The liquid crystal layer 30 is located in a box formed by sealing the first substrate 10 and the second substrate 20 with a perimeter seal. Deflection of liquid crystal layer may be controlled by an externally applied electric field.

In one embodiment, the first substrate 10 may be an array substrate, including a first base substrate 101 and a driving array disposed on the first base substrate. Driven by a driving signal, the driving array may generate a driving electric field acting on the liquid crystal layer 30. The second substrate 20 may be a color filter base substrate, including a second base substrate 201 and a color filter layer formed on the second base substrate. Liquid crystal molecules in the liquid crystal layer 30 may undergo a state change under an action of the driving electric field, blocking or allowing light to pass through the color filter layer located above the liquid crystal layer 30. As such, different colors and gradations may be presented to realize image display. In some other embodiments, the color filter layer may be disposed on the first substrate. In some other embodiments, the color filter layer may not be disposed in the liquid crystal display panel, and thus only black and white images may be displayed.

As shown in FIG. 1, the liquid crystal display panel 100 further includes a heating sensor layer 16 located inside the liquid crystal display panel 100. The heating sensor layer 16 may be located on a side of the first base substrate 101 facing the liquid crystal layer 30. The heating sensor layer 16 may also be located on a side of the second base substrate 201 facing the liquid crystal layer 30. The heating sensor layer 16 may monitor a temperature inside the liquid crystal box in real time so that heating electrodes may be activated and suspended timely.

Figure 2:
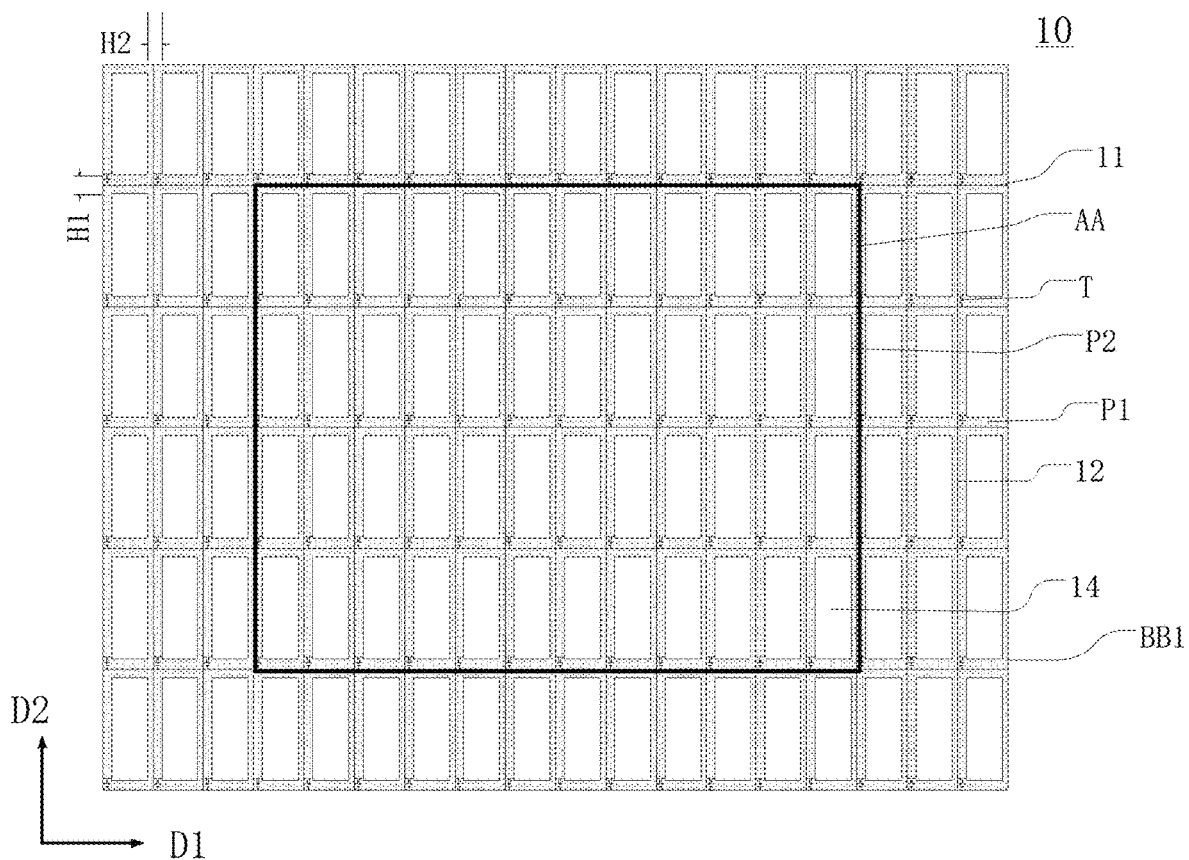
FIG. 2 illustrates a schematic structural diagram of a first substrate in a liquid crystal display panel consistent with the disclosed embodiments.

Hereinafter, the first substrate 10 is taken as an array base substrate for specific descriptions. FIG. 2 illustrates a first substrate in an exemplary liquid crystal display panel. As shown in FIG. 2, the first substrate 10 is an array substrate, including a display area AA and a first non-display area BB1. The first non-display area BB1 surrounds the display area AA. The display area AA refers to an area where the display panel may drive liquid crystal molecules to rotate after being powered on, and may thus display an image under an action of a backlight. The first non-display area BB1 refers to an area where the display panel may drive liquid crystal molecules to rotate after being powered on, but may not display an image at the end. The first non-display area BB1 includes a plurality of dummy sub-pixels P1. In the second substrate 20, a black matrix is disposed at a location corresponding to the plurality of dummy sub-pixels P1. A vertical projection of the black matrix on the first substrate 10 covers the plurality of dummy sub-pixels P1.

The first substrate 10 also includes a first base substrate 101 and a driving array formed on the first base substrate 101. The driving array includes gate lines 11 and data lines 12, which are sequentially disposed on the first base substrate 101. The gate lines 11 extend along the first direction D1, and are arranged along the second direction D2. The data lines 12 extend along the second direction D2 and are arranged along the first direction D1. The gate lines 11 and the data lines 12 intersect with each other and are insulated from each other, defining a plurality of sub-pixels. The plurality of sub-pixels includes a plurality of display sub-pixels P2 and a plurality of dummy sub-pixels P1. The plurality of display sub-pixels P2 is disposed in the display area AA, and the plurality of dummy sub-pixels P1 is disposed in the first non-display area BB1. The display sub-pixels P2 and the dummy sub-pixels P1 may have a same structure. Each of the display sub-pixels P2 and each of the dummy sub-pixels P1 may include a pixel electrode 14 and a display switching element T.

In one embodiment, structures of the display sub-pixels P2 and the dummy sub-pixels P1 are same. In some other embodiments, the dummy sub-pixels P1 and the display sub-pixels P2 may have different structures.

In one embodiment, the first direction D1 and the second direction D2 are a row direction and a column direction, respectively, and the plurality of sub-pixels are arranged in a matrix with a plurality of rows and columns. Sub-pixels located in a same column are connected to a same data line 12, and sub-pixels located in a same row are connected to a same gate line 11. Each pixel P is provided with a pixel electrode 14 and at least one display switching element T. The display switching element T may be, for example, a thin film transistor. A gate of the thin film transistor may be connected to a corresponding gate line 11, a source of the thin film transistor may be connected to a corresponding data line 12, and a drain of the thin film transistor may be connected to a corresponding pixel electrode 14. The first substrate 10 also includes a driving integrated circuit (not shown) for transmitting scanning signals for each sub-pixel through the gate lines 11, and for transmitting data signals for each sub-pixel through the data lines 12.

The first substrate 10 also includes a plurality of open regions and black matrix regions. Each of the sub-pixels includes an open region, allowing light to pass through in the display region AA. The black matrix regions include first black matrix regions H1 and second black matrix regions H2. The black matrix regions H1 extend along the first direction D1 and are arranged along the second direction D2, wherein the first black matrix region H1 refers to a non-transparent region between two adjacent rows of pixels. The second black matrix regions H2 extend in the second direction D2 and are arranged along the second direction D1, wherein the second black matrix region H2 refer to a non-transparent region between two adjacent columns of pixels. The gate lines 11 are disposed in the first black matrix regions H1, and the data lines 12 are disposed in the second black matrix regions H2.

Figure 3:
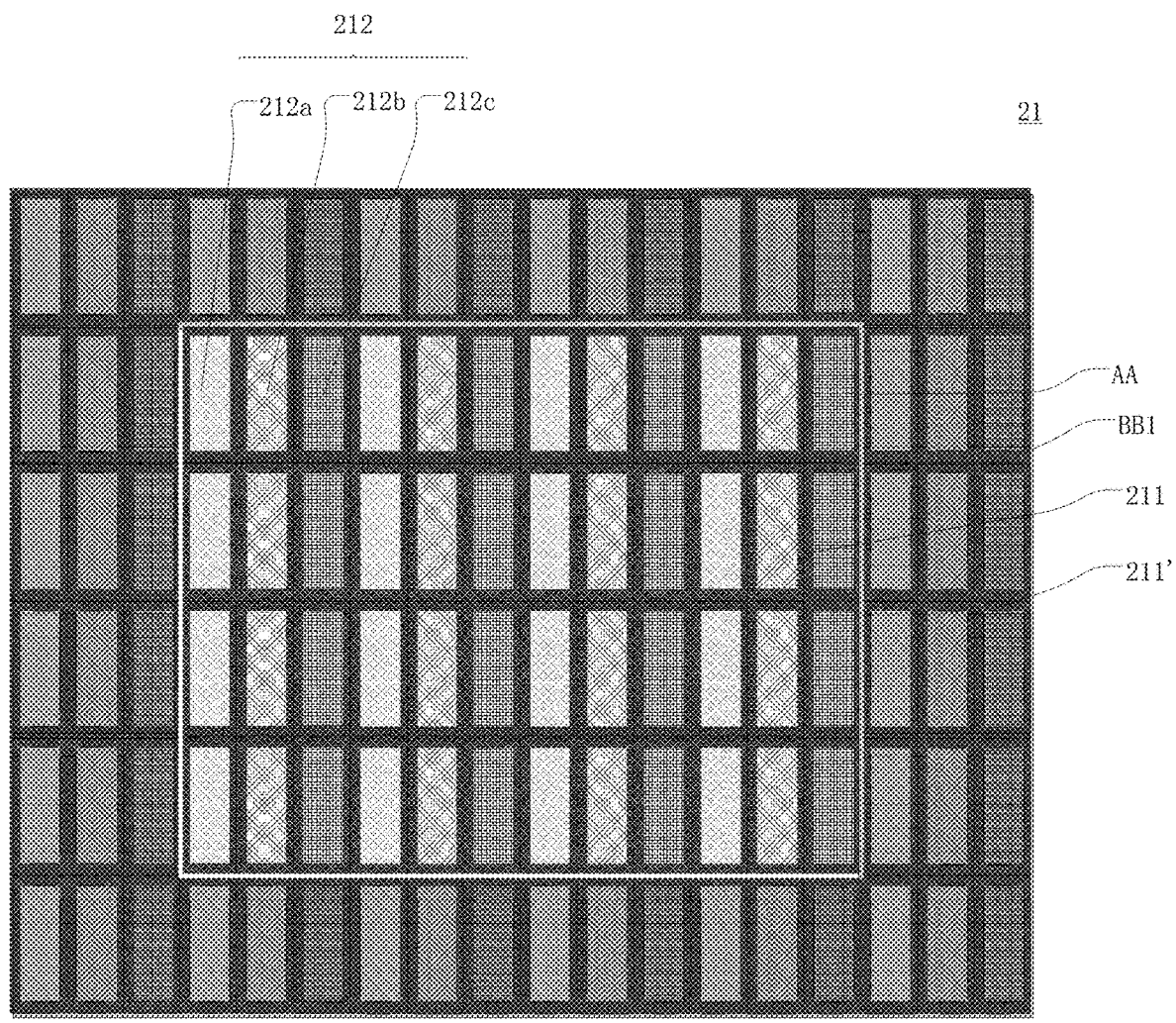
FIG. 3 illustrates a schematic diagram of a color filter layer in a liquid crystal display panel consistent with the disclosed embodiments.

The liquid crystal display panel also includes a color filter layer 21, as shown in FIG. 3. FIG. 3 illustrates a color filter layer in an exemplary liquid crystal display panel. The color filter layer 21 may include a plurality of color resistors 212 and black matrices 211 disposed around the color resistors 212. The color filter layer 21 may also include black matrices 211' correspondingly disposed at the first non-display area BB1, to ensure that after the display panel is powered on, no image is displayed at the non-display area BB1. The color resistors 212 may include, for example, a first color resistor 212a, a second color resistor 212b, and a third color resistor 212c having different colors respectively. Each of the color resistors corresponds to an open area of a sub-pixel P. The first color resistor 212a, the second color resistor 212b, and the third color resistor 212c may be, for example, a red color resistor, a green color resistor, and a blue color resistor respectively. The black matrices 211 are located between adjacent light-transparent regions, and the black matrices 211 are disposed corresponding to the black matrix regions on the first substrate 10. The gate lines 11 and the data lines 12 are located within the coverage of the black matrices 211, and may prevent light leakage due to reflections caused by metal.

In some other embodiments, the color filter layer 21 may be located on the first substrate 10, and areas covered by the black matrices 211 may form black matrix regions.

Figure 4:
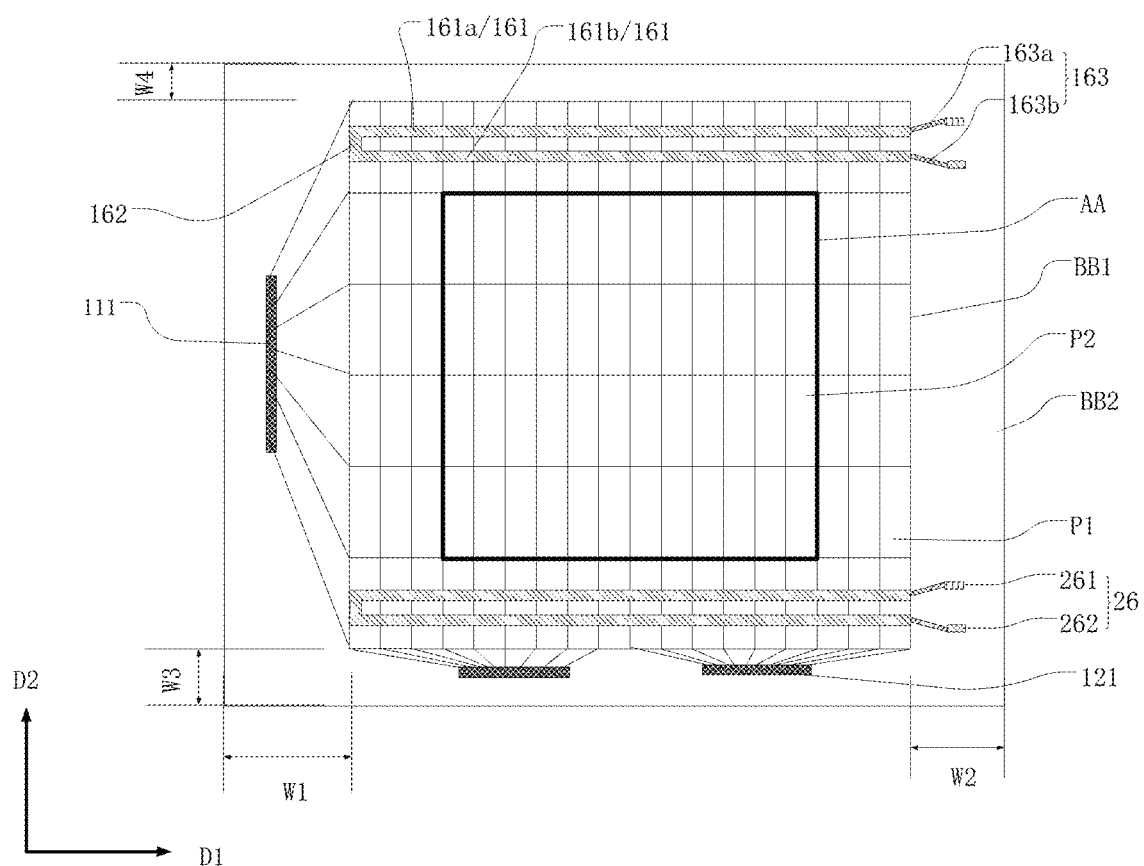
FIG. 4 illustrates a schematic diagram of heating sensors of a liquid crystal display panel consistent with the disclosed embodiments.

In one embodiment, as shown in FIG. 4, the first substrate 10 also includes at least one heating sensor, and each of the at least one heating sensor includes at least one sub-sensor and two sensor terminals. The two sensor terminals include a first sensor terminal and a second sensor terminal. The first sensor terminal and the second sensor terminal are respectively connected to two ends of at least one of the at least one sub sensor. The first sensor terminal and the second sensor terminal may be respectively connected to two ends of one of the at least one sub-sensor. Or the first sensor terminal and the second sensor terminal may be respectively connected to two ends of at least two electrically connected sub-sensors. FIG. 4 only illustrates an exemplary configuration wherein the first sensor terminal and the second sensor terminal are respectively connected to two ends of two electrically connected sub-sensors.

Figure 5:
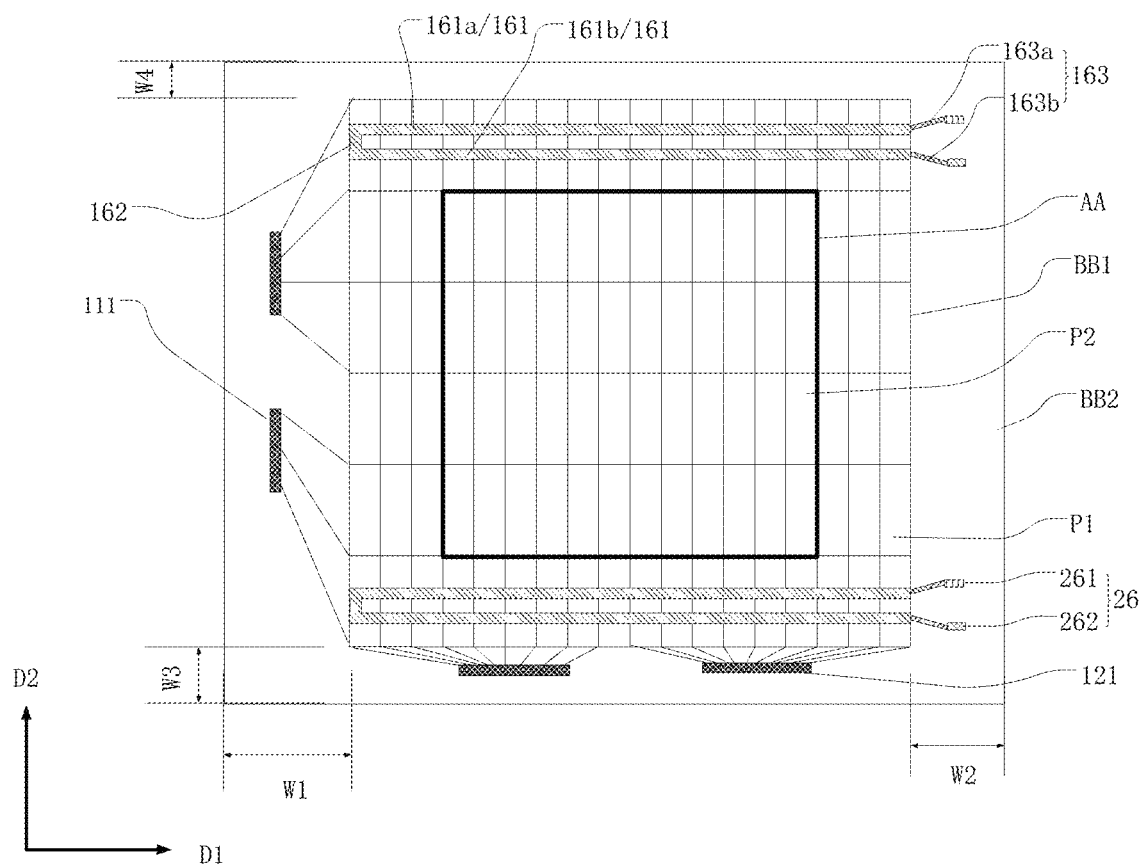
FIG. 5 illustrates a schematic diagram of heating sensors of another liquid crystal display panel consistent with the disclosed embodiments.

Specifically, a liquid crystal display panel provided by the present disclosure includes a first substrate 10 including a display area AA, a first non-display area BB1, and a second non-display area BB2. The first non-display area BB1 is disposed around the display area AA, and the second non-display area BB2 is disposed around the first non-display area BB1. The second non-display area BB2 includes a first region W1 and a second area W2 in the first direction D1, and the second non-display area BB2 includes a third region W3 and a fourth region W4 in the second direction D2. The first region W1 and the second region W2 may partially overlap with the third region W3 and the fourth region W4. The first substrate 10 also includes at least one gate driving circuit 111 and at least one source driving circuit 121. FIG. 4 illustrates an exemplary configuration with one gate driving circuit 111 and two source driving circuits 121. FIG. 5 illustrates an exemplary configuration with two gate driving circuits 111 and two source driving circuits 121. It should be noted that numbers of the gate driving circuits and the source driving circuits herein are not limited in the present disclosure. Further referring to FIG. 4, the gate driving circuit 111 is located in the first region W1. The plurality of gate lines is connected to the gate driving circuit 111. The source driving circuit 121 is located in the third region W3, and the plurality of data lines is connected to the source driving circuit 121.

As shown in FIG. 4, the gate driving circuit 111 is disposed in the first region W1, and the sensor terminal 26 is disposed in the second region W2. That is, the sensor terminal 26 and the gate driving circuit 111 are disposed on different sides of the display panel, and the sensor terminal 26 and the source driven circuit 121 are disposed on different sides of the display panel. In such a configuration, the sensor terminal 26 may avoid fan-shaped wiring for the plurality of gate lines to be connected to the gate drive circuit 111 and for the plurality of data lines to be connected to the source drive circuit. Accordingly, there may be a sufficient wiring space for connecting the sensor terminal 26 to a detecting terminal FPC (not shown). It should be noted that the detection terminal FPC may be designed as a Wheatstone bridge. A Wheatstone bridge method may be used to monitor a resistance or voltage change between two ends of the heating sensor for the purpose of monitoring temperatures inside the liquid crystal box.

Each of the heating sensors includes a first sub-sensor 161a and a second sub-sensor 161b that are electrically connected to each other. Each of the heating sensors also includes a sensor terminal 26, and the sensor terminal includes a first sensor terminal 261 and a second sensor terminal 262. Each heating sensor also includes two connection portions 163 that include a first connection portion 163a and a second connection portion 163b. One end of the first connection portion 163a is connected to the sub sensor, and the other end of the first connecting portion 163a is connected to the first sensor terminal 261. One end of the second connection portion 163b is connected to the sub sensor, and the other end of the second connection portion 163b is connected to second sensor terminals 262. The connection portions are located in the second non-display area BB2. A material of the connection portion 163 may be same as a material of the first sub-sensor 161a and the second sub-sensor 161b, or may be different from the material of the first sub-sensor 161a and the second sub-sensor 161b. The material of the first sub-sensor 161a and the second sub-sensor 161b may be a metal material, a metal alloy material or a metal oxide material, such as aluminum, nickel aluminum alloy, indium tin oxide or the like.

When the material of the connection portion 163 is different from the material of the first sub-sensor 161a and the second sub-sensor 161b, a resistance of the connection portion 163 may be smaller than the resistance of the first sub-sensor 161a and the second sub-sensor 161b. In one embodiment, the resistance of the connection portion 163 is less than or equal to one hundredth of the resistance of the first sub-sensor 161a and the second sub-sensor 161b. Such a configuration may improve a detection accuracy of the heating sensor because the connection portion 163 is disposed in the second non-display area BB2. That is, the connection portion 163 is disposed in a peripheral area of the entire display panel.

When the display panel is placed in a low temperature environment, a temperature of the second non-display region BB2 may be lower than temperatures of the first non-display area BB1 and the display area AA. Since the temperature of the second non-display area BB2 may be lower, the detected resistance value may be smaller than the resistance values detected at the display area AA and the first non-display area. Thus, the detection accuracy of the entire heating sensor may be affected. In this configuration, the resistance of the first sensor 161a and the second sub-sensor 161b is greater than the resistance of the connection portion 163, particularly much larger than the resistance of the connection portion 163. In one embodiment, the resistance of the first sensor 161a and the second sub-sensor 161b is greater than 100 times of the resistance of the connection portion 163. Thus, a ratio of the resistance of the first sub-sensor 161a and the second sub-sensor 161b is increased, and a ratio of the resistance of the connection portion 163 in the second non-display area BB2 is relatively decreased. Accordingly, the influence of the connection portion 163 on the resistance value of the entire heating sensor may be reduced, and the detection accuracy may thus be improved.

Figure 8:
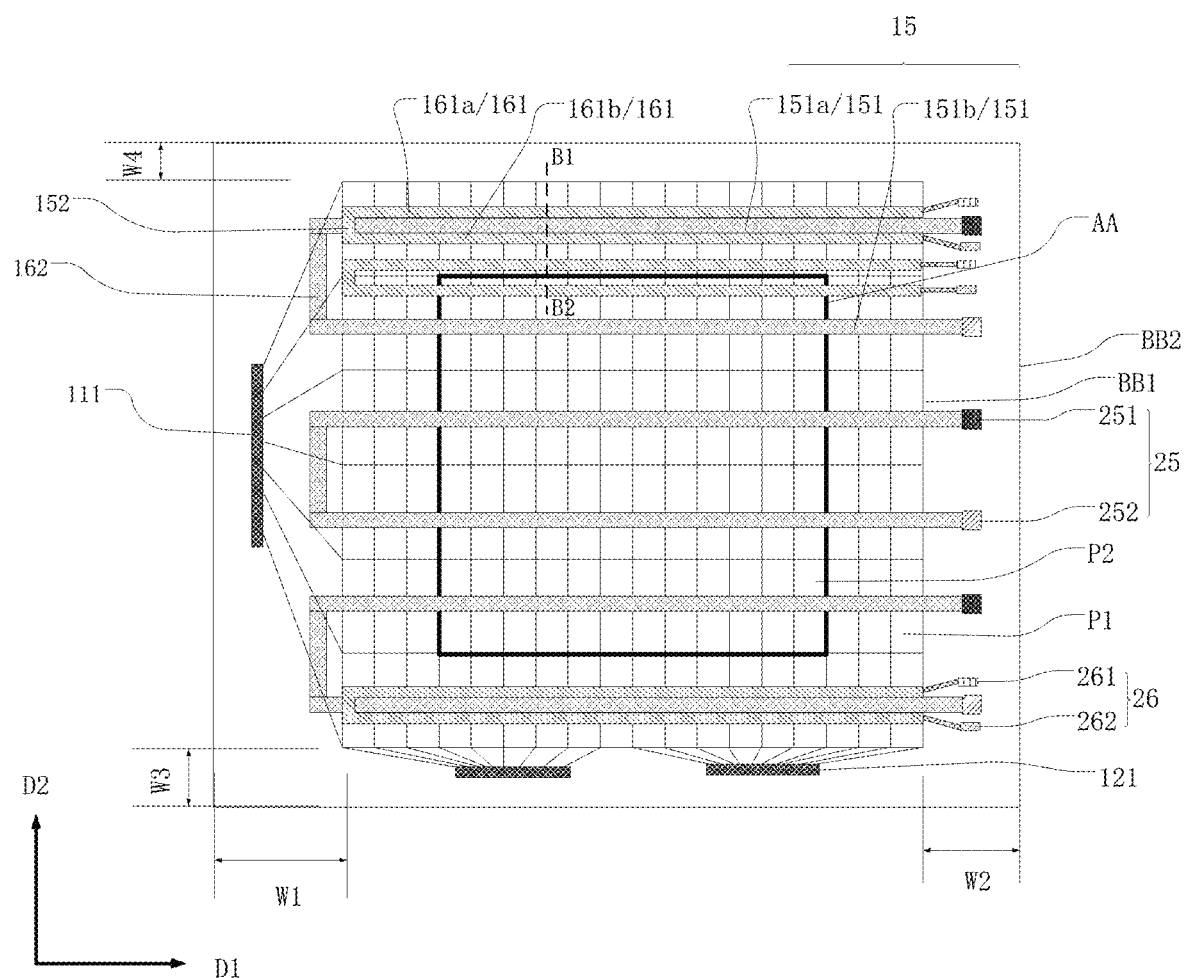
FIG. 8 illustrates a schematic diagram of heating electrodes and heating sensors of another liquid crystal display panel consistent with the disclosed embodiments.
Figure 9:
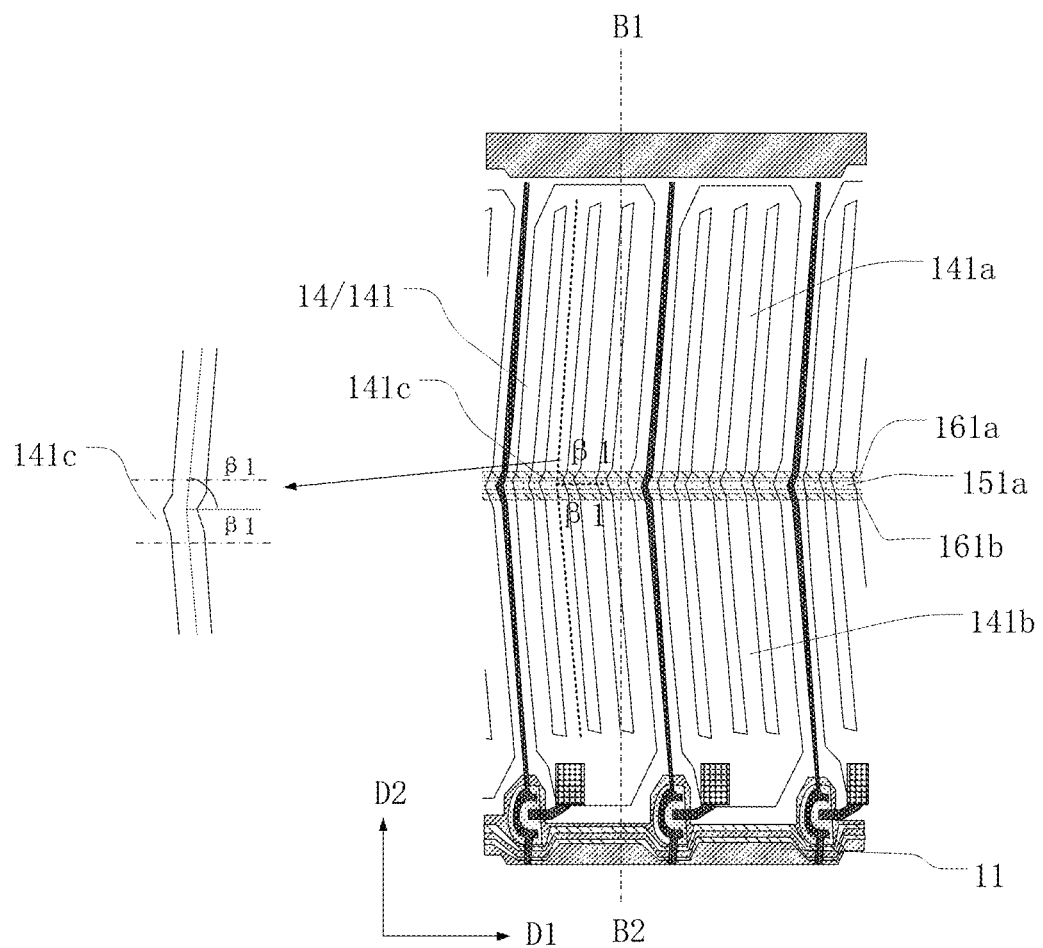
FIG. 9 illustrates a partially enlarged schematic view of a first substrate consistent with the disclosed embodiments.

As shown in FIG. 4, FIG. 8 and FIG. 9, the first sub-sensor 161a and the second sub-sensor 161b respectively extend along the first direction D1 and overlap with bent portion 141c of at least two sub-pixels. The bent portion 141c refers to a line-up area, that is, a black area for lining up in a double-domain or multi-domain structure. It should be noted that the first sub-sensor and the second sub-sensor may overlap with the bent portion of two or more sub-pixels. That is, the number of the sub-pixels is not limited. The first sub-sensor and the second sub-sensor may overlap with the bent portion of a row of the sub-pixels. Further referring to FIG. 4, one end of the first sub-sensor 161a is electrically connected to the second sub-sensor 161b through a connection sensor 162 extending in the column direction. The other end of the first sub-sensor 161a is electrically connected to the first sensor terminal 261. One end of the second sub-sensor 161b is electrically connected to the first sub-sensor 161a through a connection sensor 162 extending in the column direction, and the other end of the second sub-sensor 161b is electrically connected to the second sensor terminal 262. The first sub-sensor 161a and the second sub-sensor 161b overlap with the bent portion of the x-th row of sub-pixels, where x is an integer greater than or equal to 1. That is, the first sub-sensor 161a and the second sub-sensor 161b overlap with the bent portion of a same row of sub-pixels.

In FIG. 4, two heating sensors are disposed. Each of the heating sensors overlaps with the bent portion of a row of sub-pixels, and each of the heating sensors is disposed in the first non-display area BB1 perpendicular to the second direction D2. That is, the heating sensors are respectively disposed in two rows of dummy sub-pixels close to the display area AA from the second direction D2. Accordingly, the temperature in the box may be detected without affecting an aperture ratio of the display panel. In addition, when the first sub-sensor 161a and the second sub-sensor 161b are connected to the sensor terminal 26 through the connection portion 163, the connection portion 163 may have sufficient space to be routed without affecting the routing of other lines.

It should be noted that, in addition to the first non-display area BB1 perpendicular to the second direction D2, the heating sensors may also be disposed in the display area. In addition to monitoring an ambient temperature of the display area AA in real time, a temperature in the display area AA may also be detected. As such, a configuration with a plurality of heating sensors may improve an accuracy of detection and a stability of detection data. The present disclosure does not limit a number of heating sensors.

In one embodiment, heating sensors are disposed in the liquid crystal box, and may directly detect a temperature inside the box. A temperature of the liquid crystal layer detected inside the box may be more accurate than a temperature detected outside a display panel. In FIG. 4, the heating sensors are disposed on the first substrate, while conventional sensors for monitoring temperatures of a liquid crystal layer are often disposed outside a display panel.

In actual applications, a liquid crystal display panel may be used in a low temperature environment, such as in a temperature range of approximately −20° C. to −30° C., or in a high temperature environment, such as in a temperature range of approximately 50° C. to 70° C. Since a temperature inside a display panel may affect a change of a liquid crystal capacitance, and thus affect a display quality, compensation may be needed to improve the display quality. In a related art, a heating sensor is often disposed outside a display panel to monitor the liquid crystal temperature, and the detected temperature and the actual temperature of the liquid crystal in the liquid crystal display panel may have a deviation of approximately 10° C.-15° C. That is, in the related art for a low temperature environment, the detected temperature may be lower than the actual liquid crystal temperature by approximately 10° C. to 15° C. In the related art, the temperature detected in a high temperature environment may be higher than the actual liquid crystal temperature by approximately 10° C. to 15° C. The temperature detection results with deviation may be fed back to an integrated circuit, and the integrated circuit may give voltage compensations based on the temperature detection results with deviation. Accordingly, in the related art, the display panel may be mis-compensated, and the display quality may not be improved.

In one embodiment, a heating sensor is disposed inside the display panel and, particularly, in the liquid crystal box. This configuration may accurately detect a temperature of the liquid crystal display panel in real-time. The detected temperature is approximately an actual temperature of the liquid crystal, avoiding the deviation of approximately 10° C. to 15° C. existing in the related art. Accordingly, in this configuration, different voltage compensations may be given based on the different detected temperatures, and the display quality may thus be improved.

In another embodiment, the display panel further includes at least one heating electrode between the first base substrate 101 and the second base substrate 201. Each heating electrode includes at least one sub-electrode, and two ends of each heating electrode are connected to a first heating power terminal and a second heating power terminal, respectively. The heating electrode is disposed inside the liquid crystal box for heating the liquid crystal layer in the liquid crystal box. Heat generated by the heating electrode may directly act on liquid crystal molecules in the liquid crystal layer, thereby enabling the liquid crystal display panel to quickly start in a low temperature environment. This configuration may improve a response speed of the liquid crystal molecules in the liquid crystal layer in a low temperature environment, and ensure the display quality of the liquid crystal display device. Thus the problem of a low response speed of a liquid crystal display device in a low temperature environment may be solved.

Figure 6:
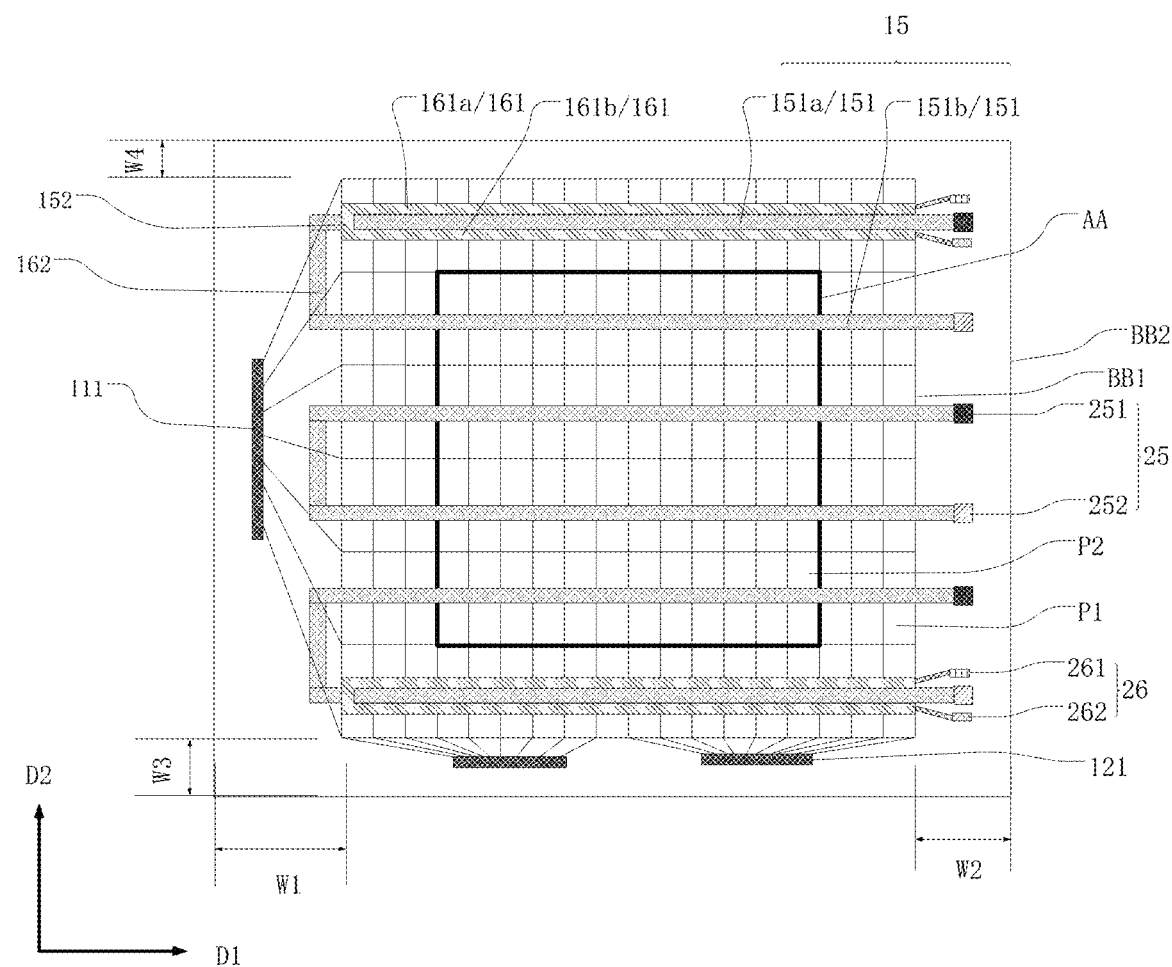
FIG. 6 illustrates a schematic diagram of heating electrodes and heating sensors of a liquid crystal display panel consistent with the disclosed embodiments.

Specifically, FIG. 6 illustrates a schematic diagram of heating electrodes and heating sensors of an exemplary liquid crystal display panel. A difference from FIG. 4 is that a plurality of heating electrodes is disposed on the first substrate. Heating power terminals 25 and sensor terminals 26 are disposed in the second region W2, and the gate driving circuit 111 is located in the first region W1. That is, the sensor terminals 26 and the gate driving circuit 111 are disposed on different sides of the display panel. In this configuration, the sensor terminals 26 and the heating power terminals 25 may avoid the fan-shaped wiring for the plurality of gate lines to be connected to the gate driving circuit 111. Thus there may be sufficient space for the sensor terminals 26 to be connected to the detecting terminals FPC (not shown) and for the heating power terminals 25 to be connected to the heating circuit control terminals (not shown). Further, disposing the sensor terminals and the heating power terminals on a same side may reduce the number of the detecting terminals ends FPC, and thus saving costs. Meanwhile, setting the sensor terminals and the heating power terminals on a same side may save fabrication steps, and may avoid impacts of heat generated by operations of the gate driving circuit.

In FIG. 6, each of the heating power source terminals 25 includes a first heating power source terminal 251 and a second heating power source terminal 252. Each of the heating electrodes 15 includes at least two sub-electrodes 151 electrically connected to each other. The two sub-electrodes electrically connected to each other include a first sub-electrode 151a and a second sub-electrode 151b. The first sub-electrode 151a and the second sub-electrode 151b respectively overlap with the bent portion of at least two sub-pixels and extend in the first direction D1.

In one embodiment, the first sub-electrode 151a overlaps with the bent portion of the x-th row of sub-pixels, and the second sub-electrode 151b overlaps with the bent portion of the (x+1)-th row sub-pixels, where x is an integer greater than or equal to 1. In a configuration with sub-electrodes overlapping with bent portion, i.e. with sub-electrodes disposed in the line-up areas, the liquid crystal in the liquid crystal layer may be heated without affecting the aperture ratio of the display area, and heating uniformity may also be ensured.

In one embodiment, one end of the first sub-electrode 151a is electrically connected to the second sub-electrode 151b through a connection electrode 162 extending in the column direction. The other end of the first sub-electrode 151a is electrically connected to the first heating power terminal 251. One end of the second sub-electrode 151b is electrically connected to the first sub-electrode 151a by the connection electrode 162 extending in the column direction. The other end of the second sub-electrode 151b is electrically connected to the second heating power terminal 252. In this way, a plurality of heating electrodes and a plurality of heating sensors may be simultaneously disposed on the first substrate. Accordingly, the liquid crystal in the liquid crystal layer may be heated ensuring normal operations a low temperature environment, and meanwhile temperatures in the liquid crystal box may be monitored in real time.

When the temperature of the display panel detected by the heating sensors is lower than a preset temperature value/preset temperature range, the heating control circuit may control the heating electrodes to perform heating to make the liquid crystal display panel work normally. After the liquid crystal display panel works normally, the heating electrodes may stop working. When the heating sensors detect that the temperature is lower than the preset temperature value/preset temperature range, the heating control circuit may re-control the heating electrodes for heating to make the liquid crystal display panel work normally. Such a reciprocating heating/stopping heating process may ensure that the liquid crystal display panel can operate normally without causing poor display quality due to excessive heating. The preset temperature value/preset temperature range refers to a temperature value/temperature range where the liquid crystal may be normally deflected under a premise of high display quality.

In one embodiment, heating sensors are disposed in dummy sub-pixel areas adjacent to two sides of the display area AA perpendicular to the second direction D2. Such a configuration may not affect the aperture ratio of the display area. Meanwhile, since a portion of a display panel closer to an application environment area may have a higher heat dissipation rate, the first non-display area BB1 radiates heat faster than the display area AA. The heating sensors may timely detect temperatures of the first non-display area BB1 around the AA area and feed results back to a heating control circuit. The heating electrodes may then timely start heating to ensure the display quality when the display panel works at a low temperature.

By disposing heating sensors inside a display panel, specifically, disposing heating sensors on a first substrate, a temperature inside the display panel may be monitored in real time. In the related art, a heating sensor is often placed outside the display panel, and thus an accurate temperature inside the box may not be detected. The detected temperature may have a certain deviation. When a display panel is placed in a low temperature environment such as approximately −50° C. to −45° C., the temperature inside the box needs to be heated by the heating electrodes to a range of approximately −10° C. to 0° C., or other temperature value/temperature range that may ensure the display quality. In the related art, the heating sensor is placed outside the panel, and the detected temperature has a deviation of approximately 10° C. to 15° C. from the actual temperature inside the box. For example, when the temperature inside the box is −10° C., the display panel may operate without a need to activate the heating electrode. But the temperature detected by the related art may be −20° C., which may cause the heating electrodes to start heating the display panel. This may cause unnecessary power waste of the display panel. In one embodiment, the heating sensor is placed inside the display panel, or the heating sensor is placed in the box, to accurately monitor the temperature inside the box in real time, avoiding the temperature deviation of the related art. Accordingly, in this configuration, the heating electrode may be started and suspended in real time, ensuring display quality of the display panel and avoiding waste of power.

Figure 7:
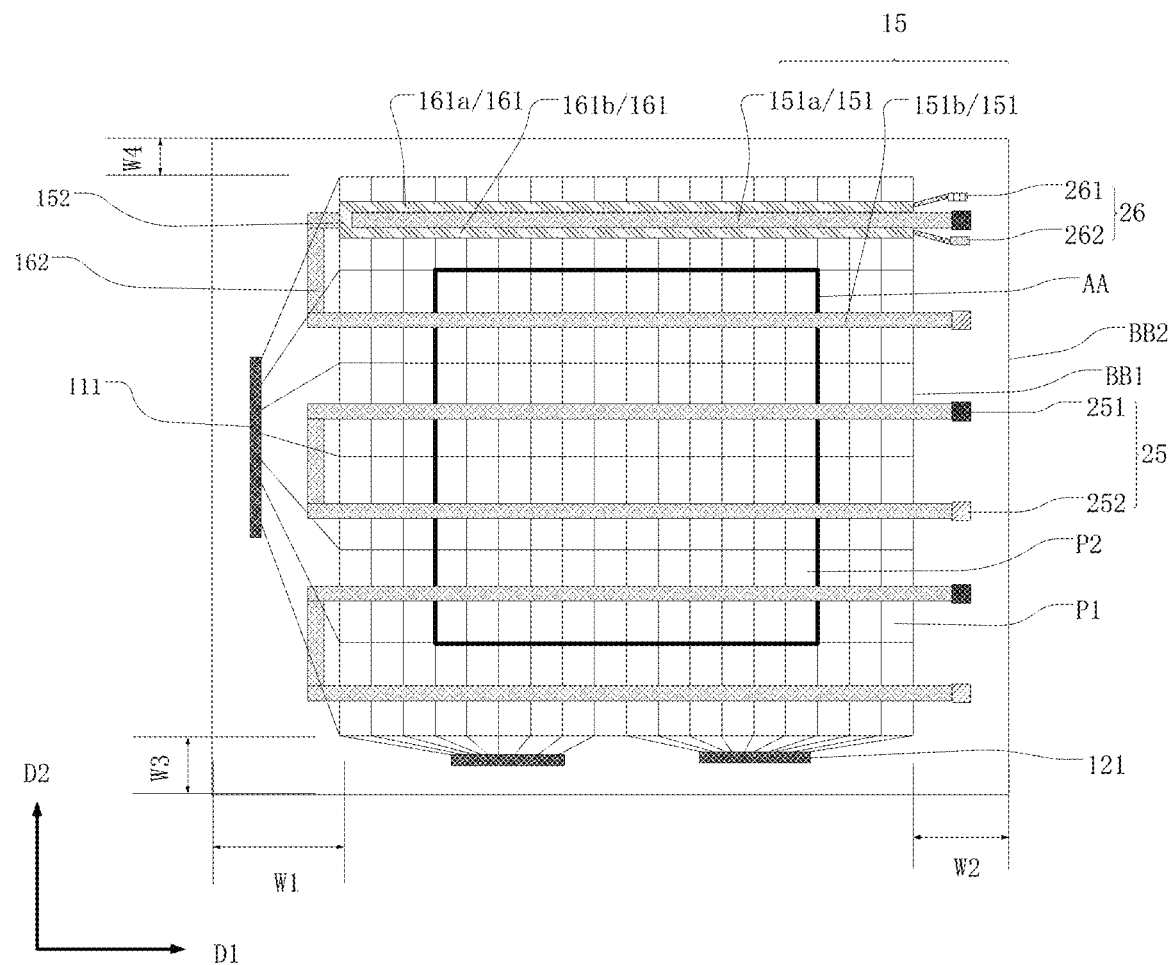
FIG. 7 illustrates a schematic diagram of heating electrodes and a heating sensor of another liquid crystal display panel consistent with the disclosed embodiments.

FIG. 7 illustrates a schematic diagram of heating electrodes and a heating sensor of another exemplary liquid crystal display panel. The difference from FIG. 6 is that only one heating sensor is disposed, and the heating sensor is disposed at a dummy sub-pixel row region perpendicular to the second direction D2 and away from the source driving circuit 121. In this configuration, when the display panel is in operation, the source driving circuit 121 may generate a certain amount of heat, and transfer the heat to an adjacent dummy sub-pixel row region. The heat may provide a certain amount of heat compensation to the phenomenon of faster heat dissipation at periphery of the display panel. Disposing only one heating sensor away from the source driving circuit 121 may also monitor a temperature of the display panel.

FIG. 8 illustrates a schematic diagram of heating electrodes and heating sensors of another exemplary liquid crystal display panel. The difference from FIG. 6 is that one more heating sensor is disposed. The heating sensor is disposed at a first black matrix region between the display sub-pixels and the dummy sub-pixels. The first black matrix region refers to a non-transparent region between adjacent two rows of pixels. The heating sensor includes a first sub-sensor 161a and a second sub-sensor 161b respectively extending along a first black matrix region between a row of dummy sub-pixels and a row of display sub-pixels in the first direction D1. Such an arrangement may detect a temperature difference between the dummy sub-pixel line-up area and the first black matrix area without affecting the aperture ratio of the display area.

Figure 10:
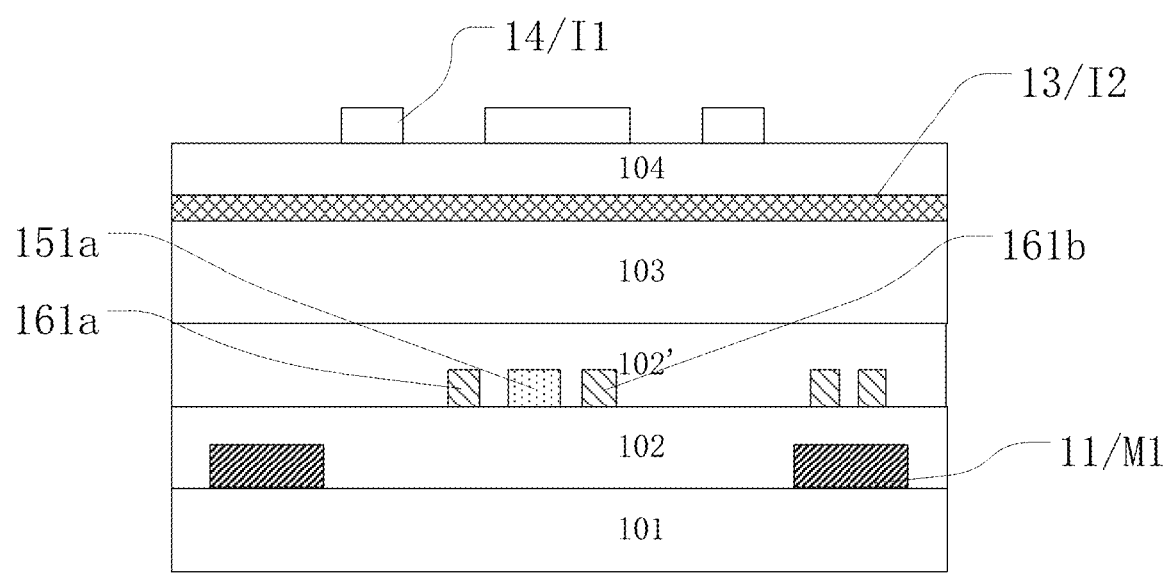
FIG. 10 illustrates a cross-sectional view at the B1-B2 cross section of the first substrate illustrated in FIG. 8, consistent with the disclosed embodiments.

FIG. 9 and FIG. 10 illustrate specific positional structures of the pixel array, the heating electrodes 15, and the heating sensors on the first substrate 10. FIG. 9 shows a partially enlarged schematic view of an exemplary first substrate, and FIG. 10 shows a cross-sectional view at the B1-B2 cross section of the exemplary first substrate shown in FIG. 9. The partially enlarged region herein refers to an enlargement of a dummy sub-pixel area away from the source driving circuit 121. The first substrate 10 adopts a double-domain structure as shown in FIG. 9, because a double-domain structure may have a wider viewing angle than a single-domain structure, thus having a higher display quality. Specifically, each of the sub-pixels includes at least one strip electrode, and each of the at least each strip electrode includes a first branch electrode, a second branch electrode and a bent portion. The bent portion connects the first branch electrode and the second branch electrode, and the first branch electrode and the second electrode are symmetrically disposed with respect to the first direction.

Specifically, as shown in FIG. 9, in each of the sub-pixels, a first electrode 14 includes at least one strip electrode 141 connected to each other and arranged in parallel. The at least one strip electrode 141 may be formed, for example, by slitting the first electrode 14. Each of the at least one strip electrode 141 includes a first branch electrode 141a, a second branch electrode 141b, and a bent portion 141c. The bent portion 141c connects a first branch electrode 141a, a second branch electrode 141b. An angle between extending directions of the first branch electrode 141a and the first direction D1 is β1, wherein 45°<β1<90°. The second branch electrode 141b and the first branch electrode 141a are symmetrically disposed with respect to the first direction D1. The heating electrode 15 includes a plurality of first strip-shaped heating electrodes 151 extending in the first direction D1 and arranged in the second direction D2. In a same row of dummy sub-pixels, the first sub-electrode 151a is disposed at a boundary position between the first branch-electrode 141a and the second branch-electrode 141b. The first sub-electrode 151a extends along the boundary position in the same row of dummy sub-pixels, going through the display area of the liquid crystal display panel.

Similarly, in a same row of dummy sub-pixel, the first sub-sensor 161a and the second sub-sensor 161b are disposed at a boundary position between the first branch-electrode 141a and the second branch-electrode 141b. The first sub-sensor 161a and the second sub-sensor 161b extend along the boundary position of the same row of virtual sub-pixels and going through the display area of the liquid crystal display panel. That is, in a line-up area of a same row of dummy sub-pixels, the first sub-sensor 161a, the first sub-electrode 151a, and the second sub-sensor 161b are sequentially arranged in the second direction D2.

In addition, a first sub-sensor 161a and a second sub-sensor 161b extending along the first direction D1 are also disposed in a first black matrix region, that is, a non-transparent region, between a row of dummy sub-pixels and a row of display sub-pixels away from the source driving circuit 121. The first sub-sensor 161a and the second sub-sensor 161b avoid areas where display switching elements are located, and thus influence of the first sub-sensor 161a and the second sub-sensor 161b to the display switching elements are avoided.

In the double-domain structure shown in FIG. 9, the first branch electrode 141a and the second branch electrode 141b are symmetrically disposed with respect to the first direction D1. Accordingly, for liquid crystal molecules at the boundary position between the first branch electrode 141a and the second branch electrode 141b, effects of the electric fields generated by the upper and lower portions of the first electrode 14 may cancel each other. Thus, the rotation direction of the liquid crystal molecules at the boundary position may be slightly more chaotic than that of the liquid crystal molecules at the light transmitting region. And the liquid crystal molecules at the boundary position may even not rotate following the directions of the electric fields. Thus, a black domain line phenomenon may occur at the boundary position, forming a non-transparent region. That is, an area where the bent portion is located may also be called a line-up area.

In one embodiment, the first sub-electrode 151a, the first sub-sensor 161a, and the second sub-sensor 161b are disposed at a position corresponding to the non-transparent region. In this configuration, heating and detecting the temperature inside the box may be achieved, and the effect of introducing the heating sensors and the heating electrodes on the display quality may be reduced. Further, this configuration may not affect the aperture ratio of the liquid crystal display panel.

It should be noted that, in addition to disposing a heating sensor in a line-up area of a row of dummy sub-pixels around the display panel, a heating sensor may be disposed in a line-up area of one or more rows of display sub-pixels in the display area AA. As such, a temperature of the display area may be detected in real time. Disposing a heating sensor and a heating electrode at a line-up area of one or more rows of display sub-pixels in the display area AA may not decrease an aperture ratio of the display panel.

In one embodiment, as shown in FIG. 10, the first substrate includes a first electrode layer I1 and a second electrode layer I2. The second electrode layer I2 is located between the first electrode layer I1 and the first base substrate 101. The first electrode layer I1 includes a first electrode 14, and the second electrode layer I2 includes a second electrode 13. The first electrode layer I1 and the second electrode layer I2 are spaced apart by a passivation layer 104, wherein the first electrode 14 is a pixel electrode, and is connected to a drain of a corresponding display switching element. The second electrode 13 is a common electrode. The pixel electrode and the common electrode may generate a parallel electric field along a plane of the first substrate under the action of an external driving signal. The first substrate also includes a first sub-electrode 151a, a first sub-sensor 161a and a second sub-sensor 161b. The heating electrode and the heating sensor may be disposed in a same layer as shown in FIG. 10. That is, the heating electrode and the heating sensor may be disposed between the first metal layer M1 and the second electrode layer I2. The heating electrode and the heating sensor may be insulated from the second electrode layer I2 by the passivation layer 103, and may be insulated from the first metal layer M1 by the gate insulating layer 102.

It should be noted that, being insulated from the data line layer (not shown) through the insulating layer 102', the heating electrode and the heating sensor may be disposed in a same layer, and in a different layer from the first metal layer M1. This configuration may avoid interactions between the connecting electrode 152 and the fan-shaped wiring. The fan-shaped wiring refers to a fan-shaped wiring by which a plurality of gate lines is connected to the gate driving circuit 111. In addition, the heating electrode and the heating sensor may also be disposed in a same layer between the first base substrate 101 and the first metal layer M1 (not shown), and may be insulated from the first metal layer M1 by an insulating layer.

It should be noted that the heating electrodes and the heating sensors may also be disposed in different layers (not shown). In one embodiment, the heating electrodes may be disposed in a same layer with the first metal layer M1, and the heating sensors may be disposed between the first metal layer M1 and the second electrode layer I2. In some other embodiments, the heating electrodes may be disposed between the first base substrate 101 and the first metal layer M1, and the heating sensors may be disposed between the first metal layer M1 and the second electrode layer I2.

Figure 11:
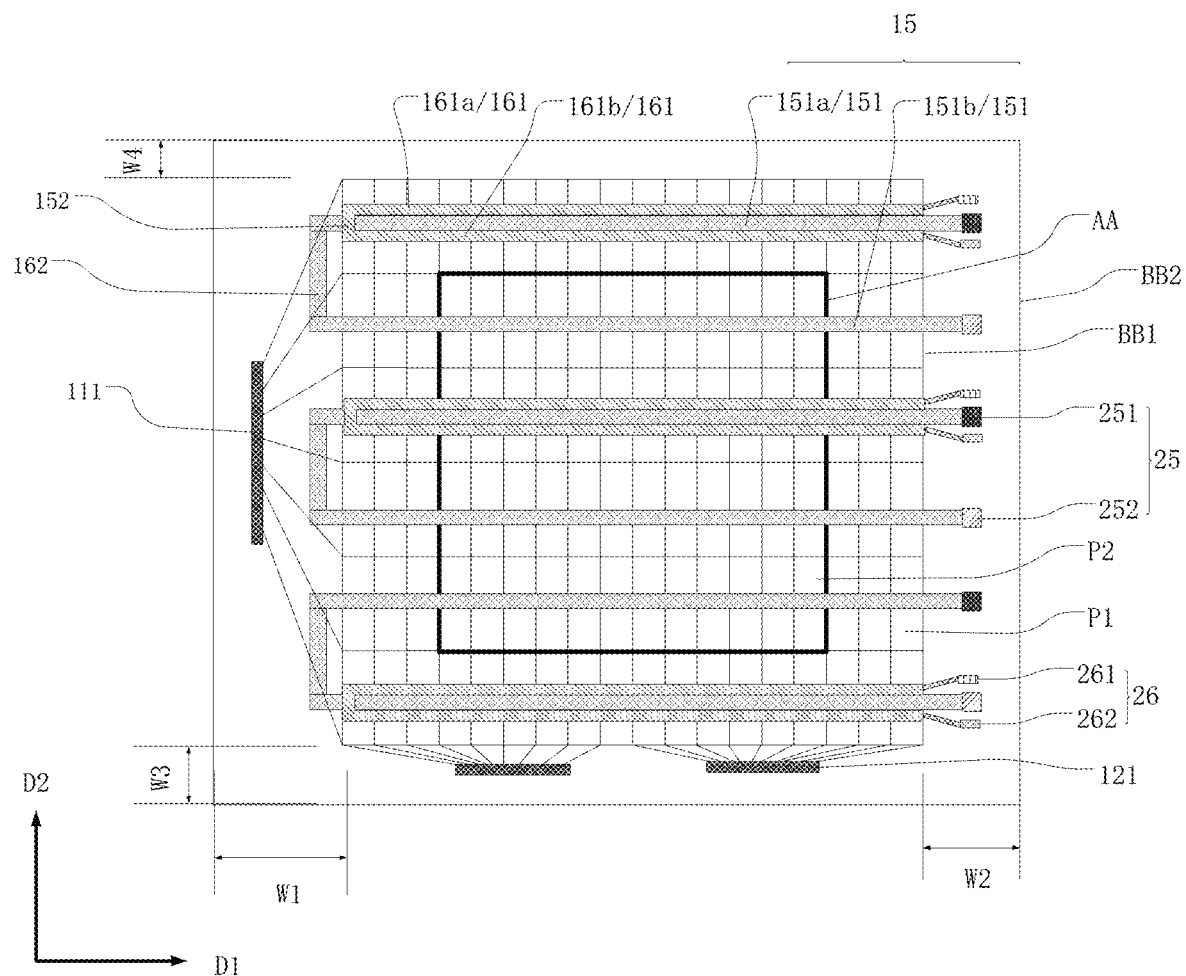
FIG. 11 illustrates a schematic diagram of heating electrodes and heating sensors of another liquid crystal display panel consistent with the disclosed embodiments.

FIG. 11 illustrates a schematic diagram of heating electrodes and heating sensors of another exemplary liquid crystal display panel. The difference from FIG. 6 is that heating sensors are disposed in the bent portion of a row of display sub-pixels in the display area AA for real-time monitoring of a temperature of the display area. It should be noted that a plurality of heating sensors is provided in this configuration, and each of the heating sensors operates separately. The heating sensors in the rows of dummy sub-pixels may detect temperatures of the rows of dummy sub-pixels after heated by the heating electrodes. The heating sensor in the row of display pixels of the display area AA may detect a temperature of the row of sub-pixels after heated by the heating electrodes.

For a display panel, along a direction from a center of the display area to a peripheral region, temperatures may be different. That is, a temperature of the first non-display area BB1 may be different from a temperature of the display area AA. In the configuration shown in FIG. 10, the heating sensors may detect the temperature of the first non-display area BB1 and the temperature of the display area AA, respectively, and the heating electrodes may respectively heat or suspend heating according to the temperatures of the first non-display area BB1 and the temperature of the display area AA fed back by the heating sensors. That is, the temperature of the first non-display area BB1 and the temperature of the display area AA may be separately monitored, and eventually the temperature of the whole display panel may become uniform.

Figure 12:
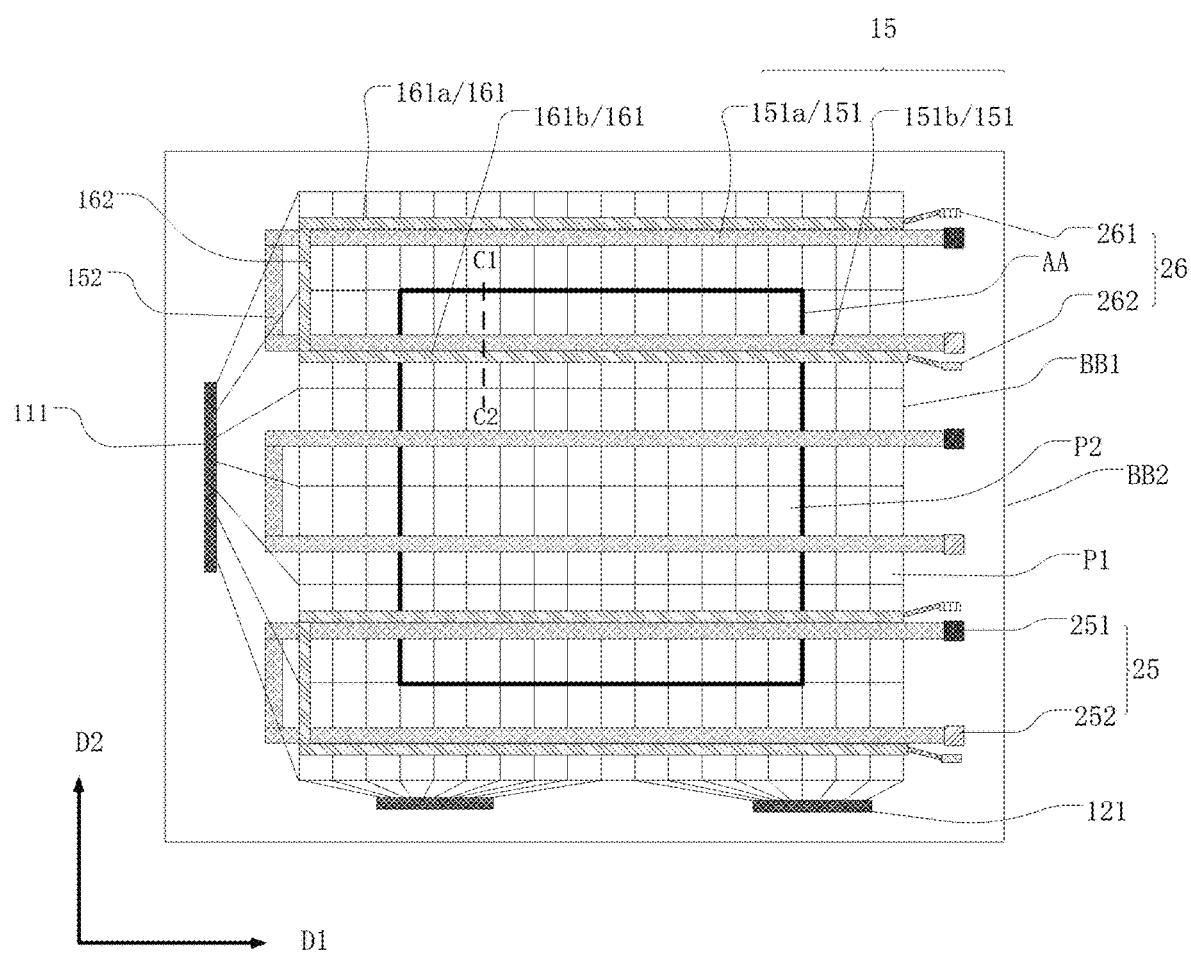
FIG. 12 illustrates a schematic diagram of heating electrodes and heating sensors of another liquid crystal display panel consistent with the disclosed embodiments.

FIG. 12 illustrates a schematic diagram of heating electrodes and heating sensors of another exemplary liquid crystal display panel. The difference from FIG. 6 is that the first sub-sensor overlaps with the bent portion of the x-th row of sub-pixels, and the second sub-sensor overlaps with the bent portion of the (x+1)-th row of sub-pixels, where x is an integer greater than or equal to 1. For example, when the first sub-sensor 161a overlaps with the bent portion of the first row of sub-pixels, the second sub-sensor 161b overlaps with the bent portion of the second row of sub-pixels. That is, two electrically connected sub-sensors of a same heating sensor may overlap with the bent portion of different rows of sub-pixels. Comparing with a heating sensor overlapping with the bent portion of one row of sub-pixels, a heating sensor overlapping with the bent portion of two rows of sub-pixels may make the detection area larger, and thus overall detection accuracy for the whole display panel may be improved.

Figure 13:
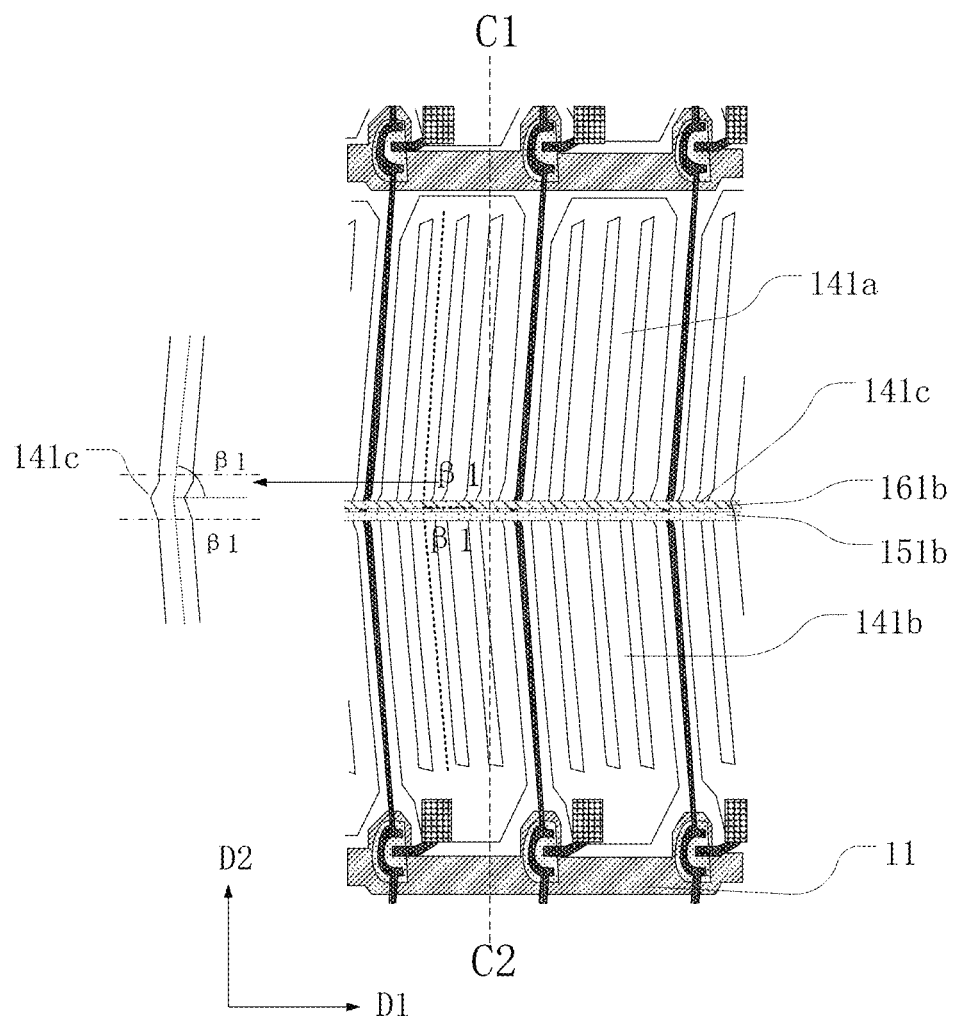
FIG. 13 illustrates a partially enlarged schematic view of another first substrate consistent with the disclosed embodiments.
Figure 14:
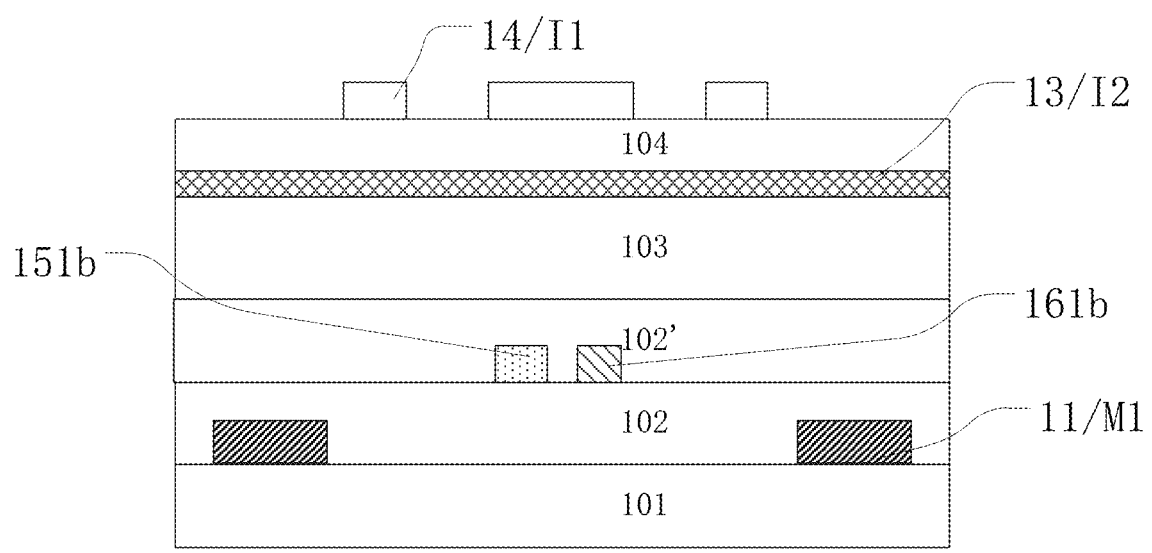
FIG. 14 illustrates a cross-sectional view at the C1-C2 cross section of the first substrate illustrated in FIG. 12, consistent with the disclosed embodiments.

FIG. 13 illustrates a partially enlarged schematic view of another exemplary first substrate, and FIG. 14 illustrates a cross-sectional view at the C1-C2 cross section of the exemplary first substrate illustrated in FIG. 13. The enlarged area here is at display sub-pixels of the display area AA. In FIG. 13, the second heating sub-electrode 151b and the second heating sub-sensor 161b are disposed in the bent portion of a row of display sub-pixels. When the heating sub-electrodes overlap with the bent portion of the display area AA, widths of the bent portion may be limited in the second the direction D2. Disposing only one heating sub-electrode and one heating sub-sensor in the second direction may sufficiently ensure the aperture ratio of the display panel. FIG. 14 illustrates arrangement relationships of each film layer. The difference from FIG. 10 is that only one heating sub-electrode and one heating sub-sensor overlap with the bent portion of one row of sub-pixels, while arrangement relationships of the film layers are same.

Figure 15:
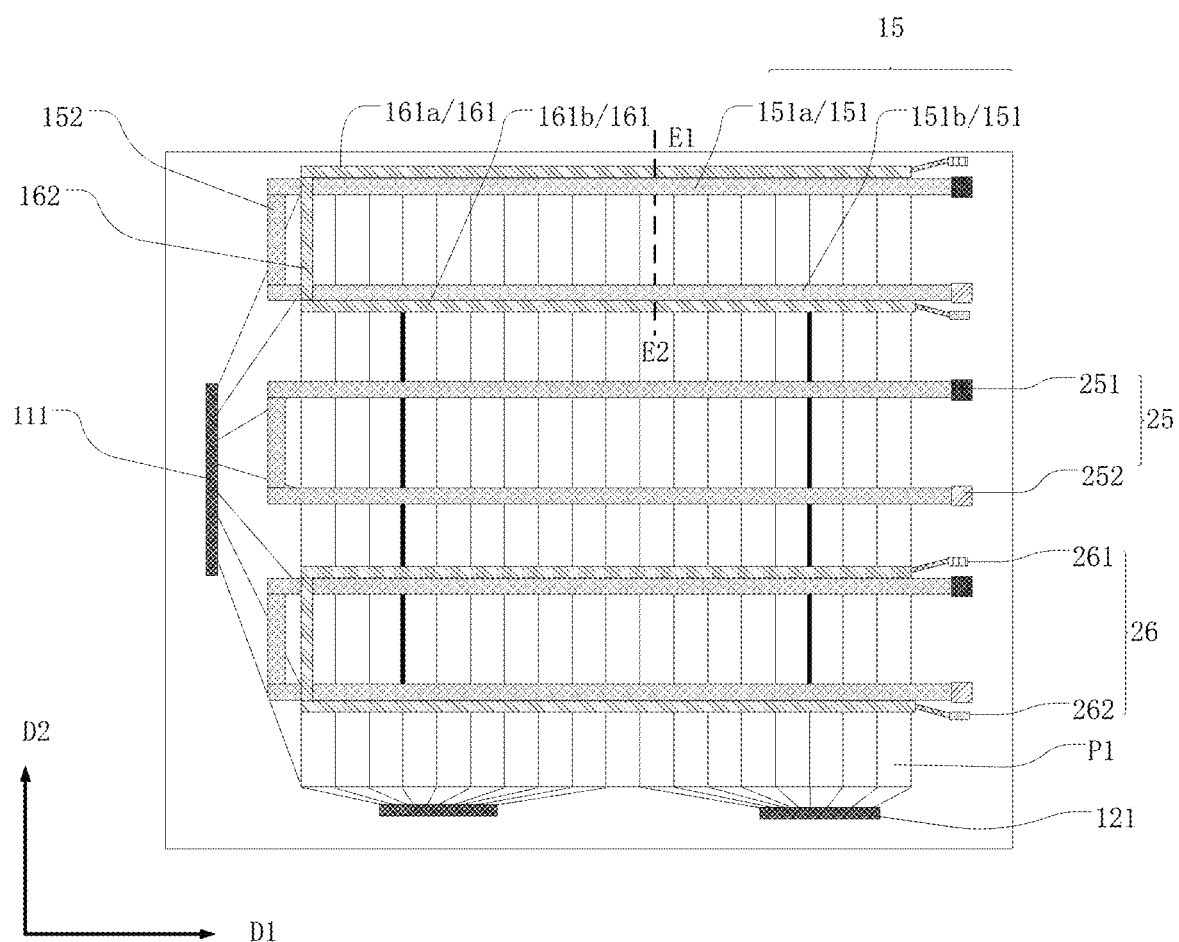
FIG. 15 illustrates a schematic diagram of heating electrodes and heating sensors of another liquid crystal display panel consistent with the disclosed embodiments.

FIG. 15 illustrates a schematic diagram of heating electrodes and heating sensors of another exemplary liquid crystal display panel. Each heating electrode includes two sub-electrodes electrically connected to each other, and the two mutually electrically connected sub-electrodes include a first sub-electrode 151a and a second sub-electrode 151b. The first sub-electrode 151a and the second sub-electrode 151b are respectively disposed in the first black matrix region extending along the first direction D1. The first black matrix region refers to a non-transparent region between two adjacent rows of pixels. The heating sub-electrodes in a same heating electrode are disposed in first black matrix regions between different rows of pixels. That is, the first sub-electrode extends along a first black matrix region between the x'-th row of sub-pixels and the (x'−1)-th row of sub-pixels in a first direction, and the second sub-electrode extends along a first black matrix region between the x-th row of sub-pixels and the (x'+1)-th row of sub-pixels in the first direction, where x' is an integer greater than or equal to 1. The heating sub-sensors included in a same heating sensor are disposed in first black matrix regions between different rows of pixels. That is, the first sub-sensor extends along a first black matrix region between the x-th row of sub-pixels and the (x−1)-th row of subpixels in the first direction; the second sub-sensor extends along a first black matrix region between the x'-th row of sub-pixels and the (x'+1)-th row of sub-pixels in the first direction along, wherein x' is an integer greater than or equal to 1.

Specifically, as shown in FIG. 15, the first sub-electrode 151a crosses a first black matrix region, which is a non-transparent region between a first row of pixels and a zeroth row of pixels. The zeroth row of pixels refers to a row of pixels where no sub-pixels are disposed. The first black matrix region between the first row of pixels and the zeroth row of pixels refers to a first black matrix region perpendicular to the second direction D2 between the second non-display region BB2 and the first non-display region BB1. The first black matrix region is away from the source driving circuit 121.

Figure 16:
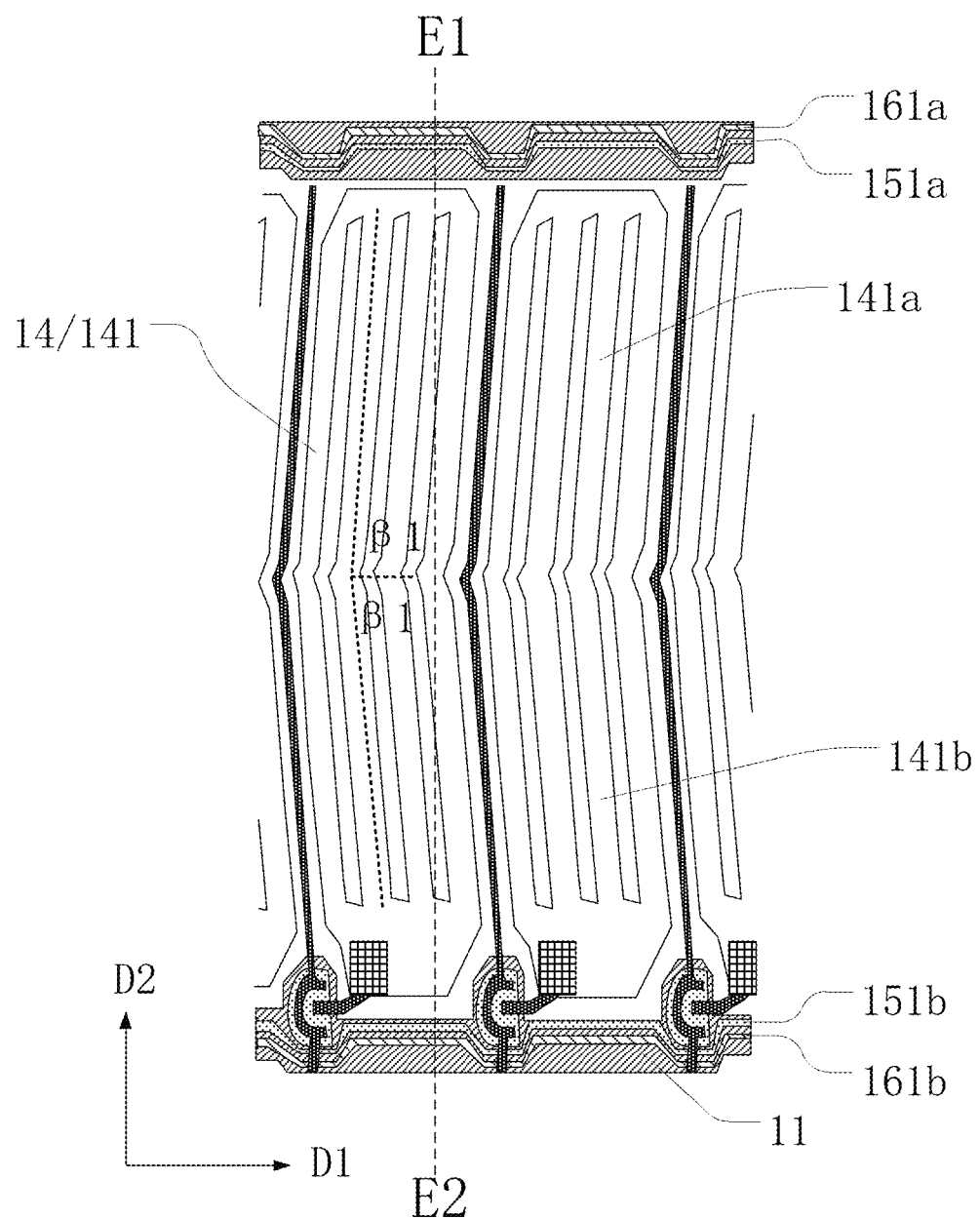
FIG. 16 illustrates a partially enlarged schematic view of another first substrate consistent with the disclosed embodiments.
Figure 17:
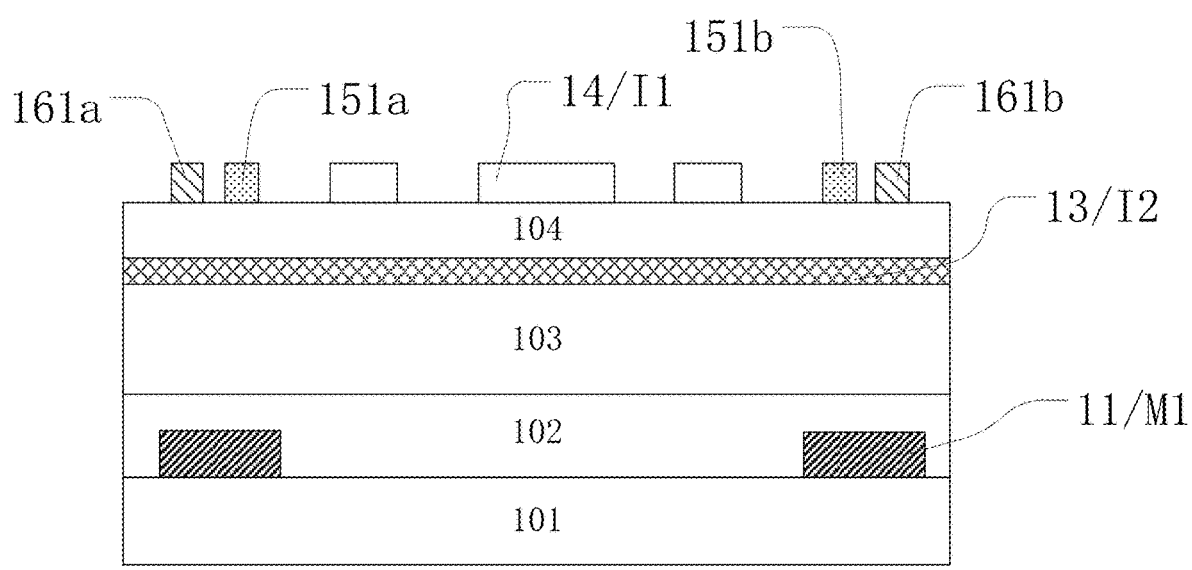
FIG. 17 illustrates a cross-sectional view at the E1-E2 cross section of the first substrate illustrated in FIG. 15, consistent with the disclosed embodiments.

FIG. 16 illustrates a partially enlarged schematic view of another exemplary first substrate, and FIG. 17 illustrates a cross-sectional view at the E1-E2 cross section of the exemplary first substrate illustrated in FIG. 16. The first substrate 10 adopts a double-domain structure as shown in FIG. 16. The partially enlarged schematic view herein refers to an enlarged schematic view of a dummy sub-pixel region perpendicular to the second direction D2 and away from the source driving circuit 121. In FIG. 16, the heating sub-electrodes and the heating sub-sensors respectively extend along the first direction in a black matrix region, and avoid a region where display switching elements are located. In such a configuration, the aperture ratio of the display panel may not be affected no matter whether the heating electrodes and the heating sensors are in the first non-display area BB1 or in the display area AA.

FIG. 17 illustrates structure relationships of each film layer. The heating sensors and the heating electrodes are disposed in a same layer with the first electrode layer I1. The first sub-electrode 151a and the first sub-sensor 161a are within coverage of a gate line 11, and the second sub-electrodes 151b and the second sub-sensor 161b are within coverage of a gate line 11. In such a configuration, the display panel may be heated and the internal temperature of the liquid crystal display panel may be monitored in real time, and the aperture ratio of the display panel may not be affected.

It should be noted that the heating sub-electrodes and the heating sub-sensors may partially overlapped with the gate lines 11. In addition, the heating sensors and the heating electrodes may also be disposed in a same layer in the first base substrate 101 near the gate layer, and isolated from the gate through an insulating layer (not shown). Also, the heating sensors and the heating electrodes may be arranged in a same layer in other achievable layers. It should be noted that the heating electrodes and the heating sensors may also be disposed in different layers (not shown), so that a wiring space in a film layer may be larger, and meanwhile technical specifications may be met.

Figure 18:
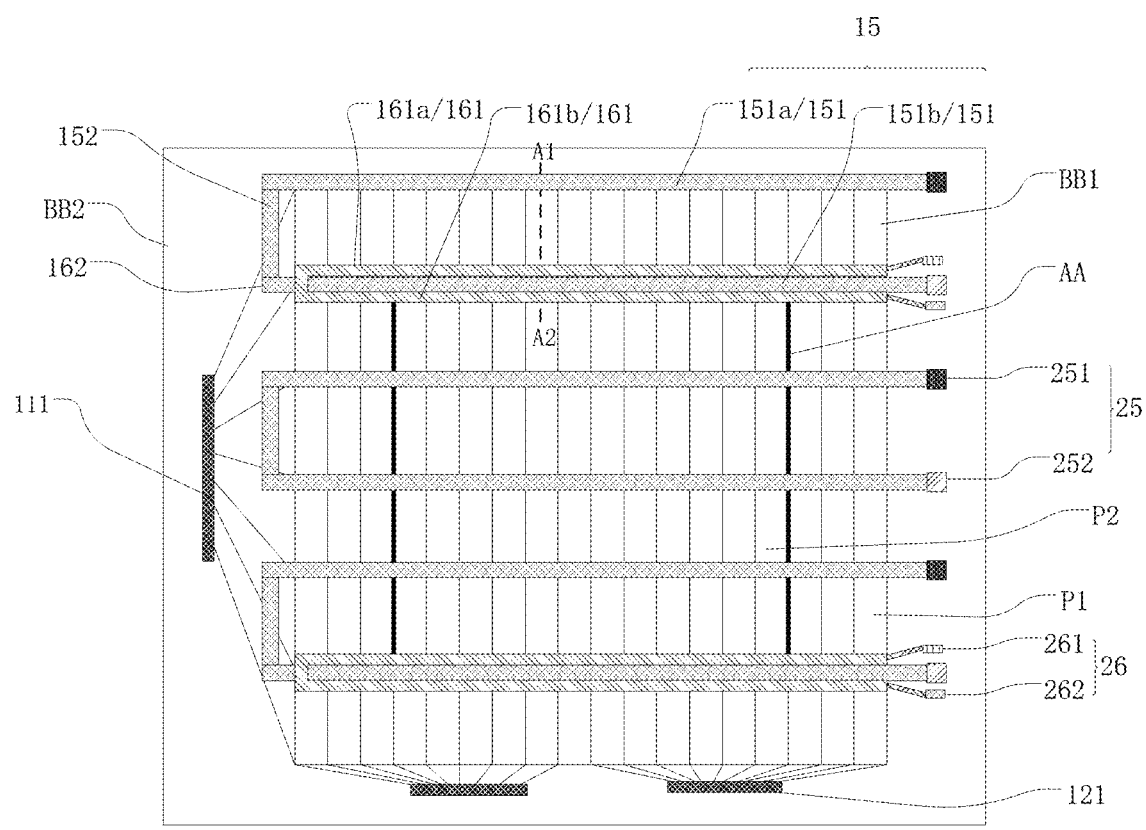
FIG. 18 illustrates a schematic diagram of heating electrodes and heating sensors of another liquid crystal display panel consistent with the disclosed embodiments.

FIG. 18 illustrates a schematic diagram of heating electrodes and heating sensors of another exemplary liquid crystal display panel. The different from FIG. 15 is that each heating sensor in FIG. 18 includes a first sub-sensor 161a and a second sub-sensor 161b, which are disposed in a first black matrix region between adjacent two rows of pixels. The first black matrix region is located between a row of display sub-pixels and a row of dummy sub-pixels.

Figure 19:
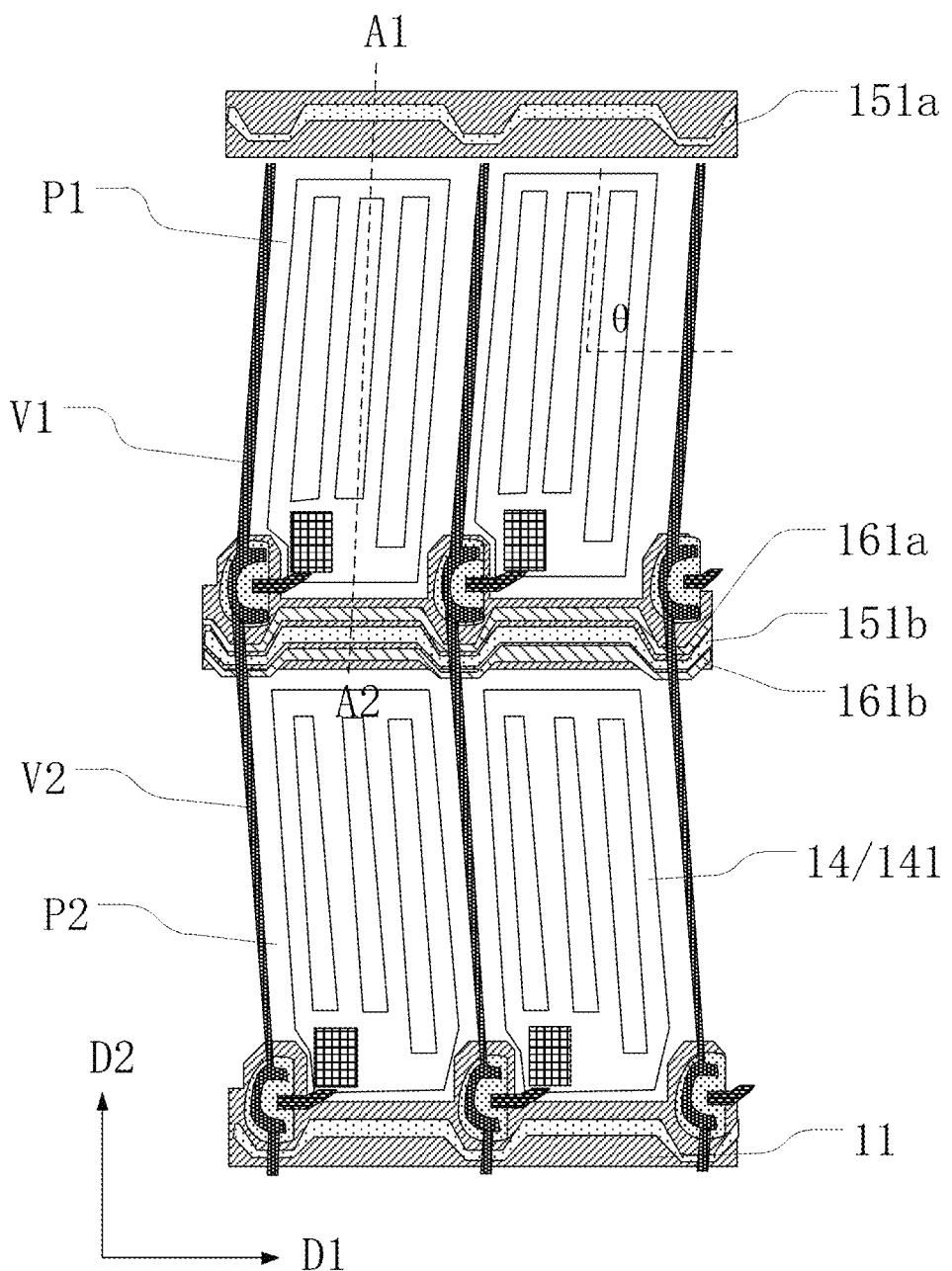
FIG. 19 illustrates a partially enlarged schematic view of another first substrate consistent with the disclosed embodiments.
Figure 20:
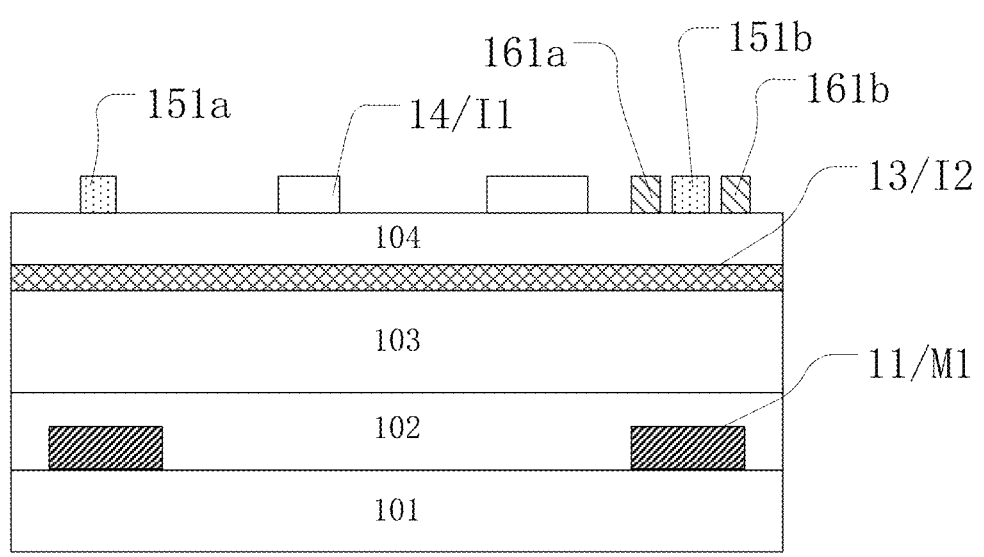
FIG. 20 illustrates a cross-sectional view at the A1-A2 cross section of the first substrate illustrated in FIG. 18, consistent with the disclosed embodiments.

FIG. 19 illustrates a partially enlarged schematic view of another exemplary first substrate. FIG. 19 is a partially enlarged view of the structure shown in FIG. 18, and FIG. 20 illustrates a cross-sectional view at the A1-A2 cross section of the exemplary first substrate illustrated in FIG. 19. The first substrate 10 provided in FIG. 19 is a pseudo-double-domain structure. Specifically, in each sub-pixel, a first electrode 14 includes a plurality of strip electrodes 141 connected to each other and arranged in parallel. For example, the plurality of strip electrodes 141 may be formed by slitting the first electrode 14. An angle between the extending direction of the strip electrode 141 and the first direction D1 is θ, where 45°<θ<90°. The plurality of sub-pixels includes a first sub-pixel P1 and a second sub-pixel P2 disposed adjacently and arranged in the second direction D2. The strip electrodes 141 in the first sub-pixel P1 and the strip electrodes 141 in the second sub-pixel P2 are symmetrically disposed relative to the first direction D1. This configuration may provide a wider viewing angle than a single domain technology, meeting users' requirements for higher display quality.

In one embodiment, each heating electrode 15 includes a first sub-electrode 151a and a second sub-electrode 151b electrically connected to each other. Each sub-electrode is disposed in a first black matrix region between adjacent two rows of pixels, that is, a non-transparent region extending in the first direction. A heating sensor includes a first sub-sensor 161a and a second sub-sensor 161b, disposed in a first black matrix region between a row of dummy sub-pixels and an adjacent row of display sub-pixels. That is, in this first black matrix region, the first sub-sensor 161a, the second sub-electrode 151b, and the second sub-sensor 161b are sequentially arranged along the second direction.

FIG. 20 illustrates arrangement relationships of each film layer. FIG. 20 is different from FIG. 17 in that the sub-sensors electrically connected to each other in the heating sensor are disposed in a non-transparent region between a row of dummy sub-pixels and an adjacent row of display sub-pixels. In the cross sectional view, the first sub-sensor 161a and the second sub-sensor 161b electrically connected to each other are disposed at a certain distance on two sides of the second heating electrode 151b. In FIG. 20, the heating electrode and the heating sensor are disposed in a same layer with the first electrode layer I1.

It should be noted that the heating sensors and the heating electrodes may be disposed in a same layer in other layers, or the heating sensors and the heating electrodes may be disposed in different layers. However, to avoid or minimize the influence on the aperture ratio, the heating electrodes and the sub-sensors of the heating sensors are within coverage of the gate lines 11, or at least partially overlap with the gate lines 11.

Figure 21:
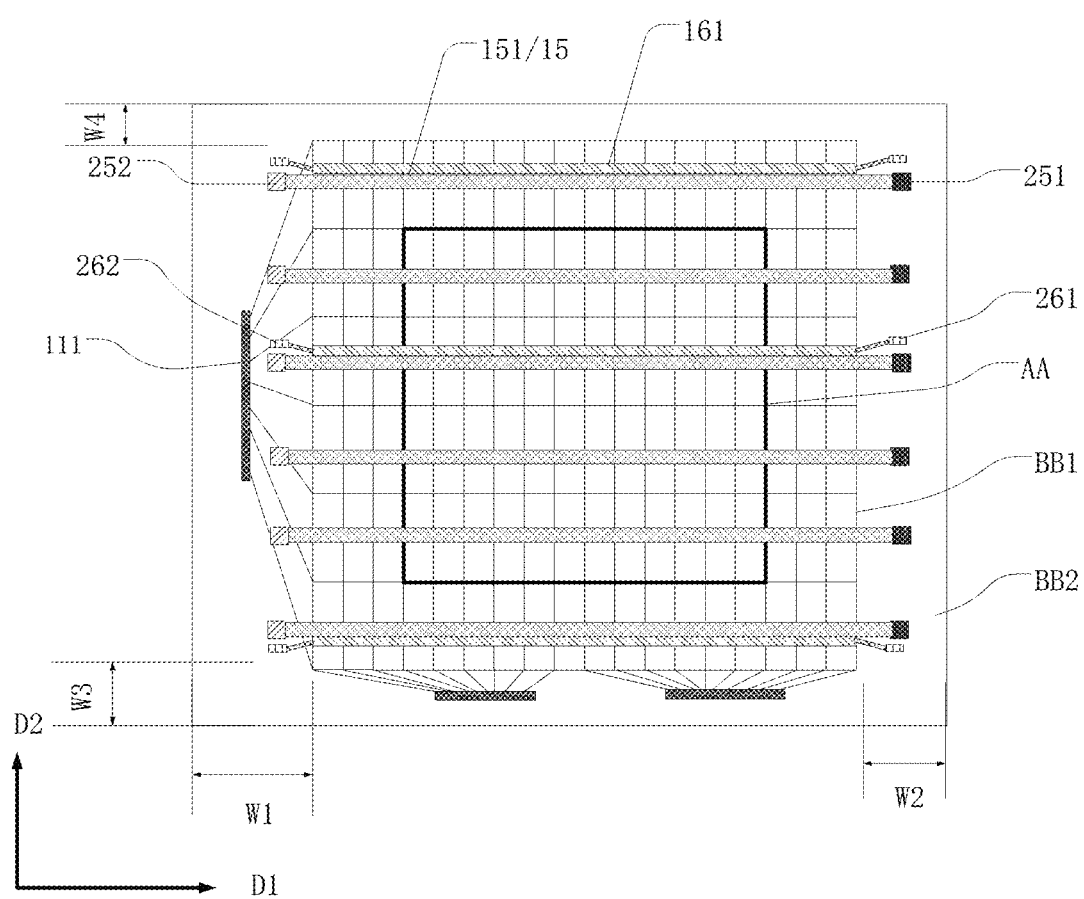
FIG. 21 illustrates a schematic diagram of heating electrodes and heating sensors of another liquid crystal display panel consistent with the disclosed embodiments.

FIG. 21 illustrates a schematic diagram of heating electrodes and heating sensors of another exemplary liquid crystal display panel. A plurality of heating electrodes and heating sensors are disposed on the first substrate. Each heating electrode 15 includes a sub-electrode 151, and each heating sensor includes a sub-heat sensor. The first heating power terminal 251 and the first sensor terminal 261 are both located in the second region W2 of the second non-display area BB2. The second heating power terminal 252 and the second sensor terminal 262 are both located in the first region W1 of the second non-display area BB2. The advantage of this configuration is that there is enough space for the heating power terminals and the heating sensor terminals to be connected to the heating control circuit and the detecting terminal FPC, respectively, avoiding a risk of short circuits.

As shown in FIG. 21, each of the heating electrodes and the heating sensors overlaps with the bent portion of a row of sub-pixels. That is, each of the heating electrodes and the heating sensors crosses a line-up area of a row of sub-pixels. Two heating sensors are respectively disposed in two rows of dummy sub-pixels that are perpendicular to the second direction D2, for detecting temperatures at positions closest to the display area AA. In addition, a heating sensor is disposed in the display area AA for detecting a temperature in the display area AA of the display panel. Thus, the entire display panel may be under detection of the heating sensors. Accordingly, the display panel may be heated by the heating electrodes, and also the temperatures near the center of the display area AA and at the periphery of the display area AA may be controlled to be uniform.

The present disclosure does not limit the number of the heating electrodes and the number of the heating sensors. The heating electrodes and the heating sensors may be disposed in a first black matrix region between two rows of adjacent pixels, that is, a non-transparent region extending along the first direction D1. In one embodiment, single heating electrodes are disposed, and each of the single heating electrodes is connected to two heating power terminals disposed on two sides of the display area AA. In some other embodiments, three or more sub-electrodes electrically connected to each other may be disposed, and the sub-electrodes electrically connected to each other are connected to two heating power terminals disposed on two sides of the display area AA. Similarly, three or more sub-sensors electrically connected to each other may be disposed, and the sub-sensors electrically connected to each other are connected to two heating sensor terminals disposed on two sides of the display area AA.

Figure 22:
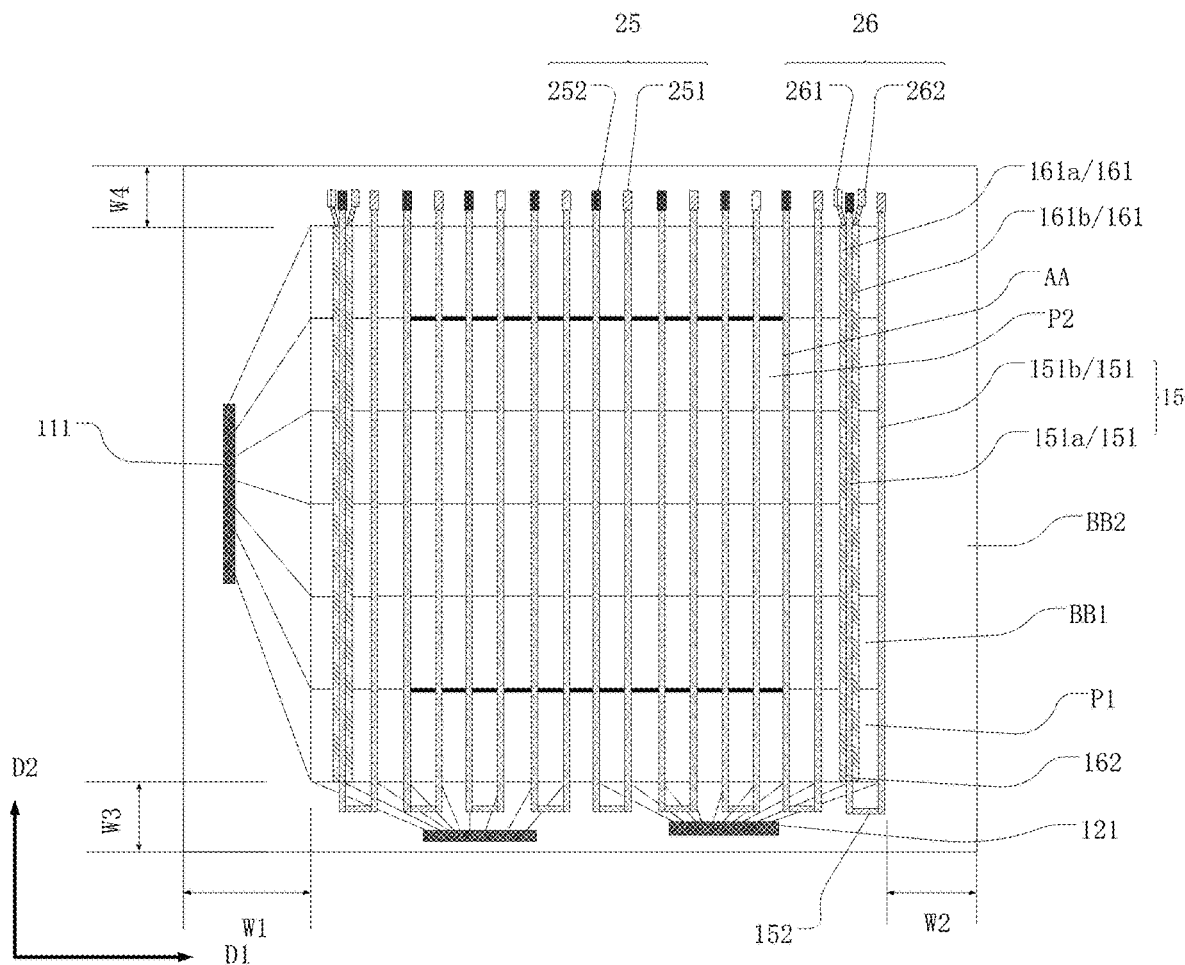
FIG. 22 illustrates a schematic diagram of heating electrodes and heating sensors of another liquid crystal display panel consistent with the disclosed embodiments.

FIG. 22 illustrates a schematic diagram of heating electrodes and heating sensors of another exemplary liquid crystal display panel. The first substrate of the liquid crystal display panel includes a plurality of heating electrodes and a plurality of heating sensors, and the heating power terminals and the heating sensor terminals are located at the fourth region W4. Each of the heating electrodes 15 includes a first sub-electrode 151a and a second sub-electrode 151b electrically connected to each other. The first sub-electrode 151a and the second sub-electrode 151b are respectively disposed on a second black matrix region extending in the second direction D2. The second black matrix region refers to a non-transparent region between two adjacent columns of pixels. One end of the first sub-electrode 151a is electrically connected to the second sub-electrode 151b through a connection electrode 152 extending in the row direction, and the other end of the first sub-electrode 151a is electrically connected to the first heating power terminal 251. One end of the second sub-electrode 151b is electrically connected to the first sub-electrode 151a through the connection electrode 152 extending in the row direction, and the other end of the second sub-electrode 151b is electrically connected to the second heating power source terminal 252.

Each of the heating sensors includes two sub-sensors electrically connected to each other, and the two sub-sensors electrically connected to each other include a first sub-sensor 161a and a second sub-sensor 161b. The first sub-sensor 161a and the second sub-sensor 161b are respectively disposed in a second black matrix region extending in the second direction D2.

One end of the first sub-sensor 161a is electrically connected to the second sub-sensor 161b through a connection sensor 162 extending in a row direction, and the other end of the first sub-sensor 161a is electrically connected to a first sensor terminal 261. One end of the second sub-sensor 161b is electrically connected to the first sub-sensor 161a by a connection sensor 162 extending in the row direction, and the other end of the second sub-sensor 161b is electrically connected to a second sensor terminal 262.

As shown in FIG. 22, the two heating sensors are disposed on the first substrate, and each sensor is respectively disposed in a second black matrix region between a column of dummy sub-pixels perpendicular to the first direction D1 and an adjacent column of display sub-pixels. In this configuration, the heating sensors are disposed in positions that do not affect an aperture ratio of the display panel. If there is a need to detect a temperature in the display area AA, disposing heating sensors in a non-transparent area between two columns of pixels may not affect the aperture ratio of the display panel. The present disclosure does not limit the number of heating electrodes and the number of heating sensors.

Figure 23:
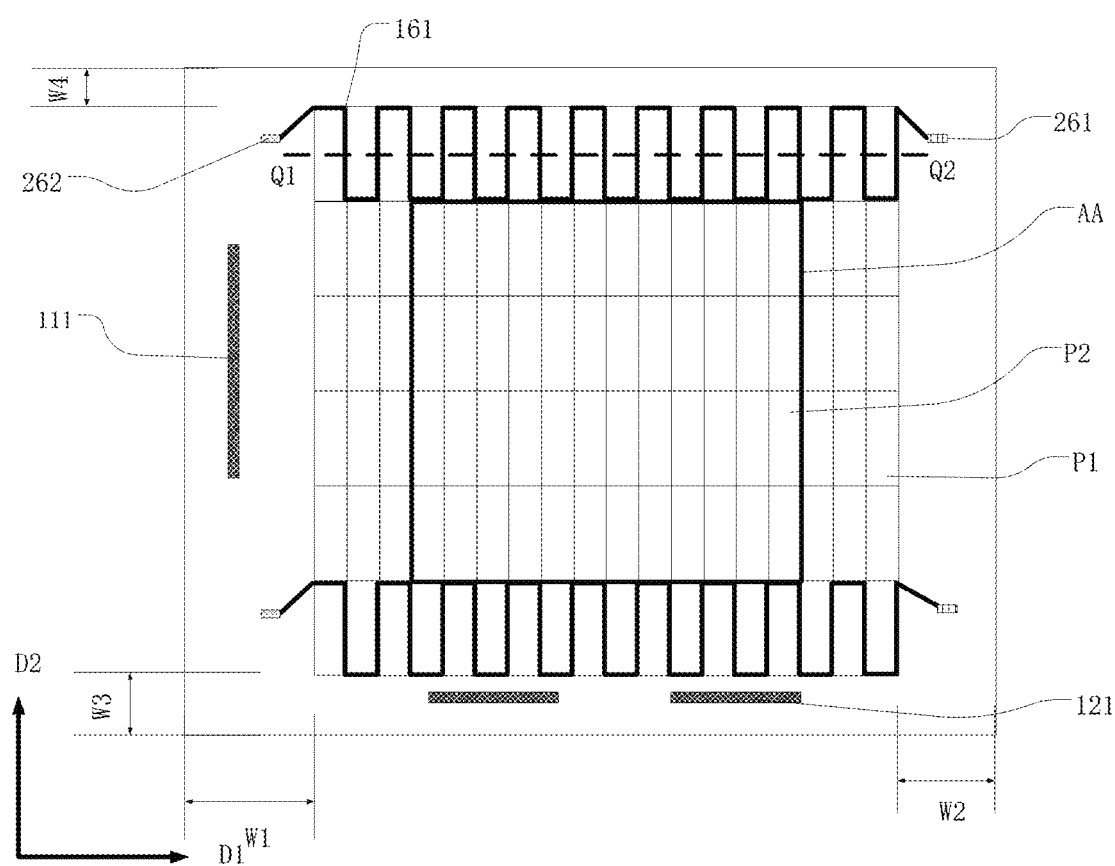
FIG. 23 illustrates a schematic diagram of heating sensors of another liquid crystal display panel consistent with the disclosed embodiments.

FIG. 23 illustrates a schematic diagram of heating sensors of another exemplary liquid crystal display panel. The second non-display area BB2 includes a first region W1 and a second region W2 in the first direction D1, and the second non-display area BB2 includes a third region W3 and a fourth region W4 in the second direction D2. Each sub-sensor includes a plurality of convex portions and a plurality of concave portions in its extending direction. The convex portions and the concave portion are alternately arranged. There is a reference line Q1Q2 between the convex portions and the concave portion in a sub-sensor. In the second direction D2, the convex portions, the reference line Q1Q2, and the concave portions are sequentially arranged. Both the convex portions and the concave portions are disposed in third black matrix regions and fourth black matrix regions.

The third black matrix region refers to a non-transparent area between adjacent two rows of pixels, and the fourth black matrix area refers to a non-transparent area between adjacent two columns of pixels. Since such a configuration is located in non-transparent areas, a real-time detection of temperatures inside the liquid crystal box may be performed without affecting the aperture ratio of the display panel.

As shown in FIG. 23, the first sensor terminal 261 is disposed in the second region W2, and the second sub-sensor terminal 262 is disposed in the first region W1. In one embodiment, a heating sensor includes only one sub-heating sensor 161, and the sub-heating sensor 161 is routed in an area of a row of dummy sub-pixels. The heating sensor terminals connected to the sub-heating sensor 161 are respectively disposed on two sides of the display panel. In such a configuration, there is a sufficient wiring space for the sensor terminal 26 to be connected to the detecting end FPC (not shown).

The sub-sensor 161 includes a plurality of alternately arranged convex portions and concave portions. Compared to a sub-sensor along a row of sub-pixels extending in the first direction D1, a sub-sensor with a plurality of convex portions and concave portions is longer. In this configuration, a peripheral temperature of each sub-pixel may be detected. Accordingly, this arrangement may have higher detection accuracy. In a case with a same resistivity and a same cross-sectional area, the longer the length of the sub-sensor, the larger the resistance value, and thus the higher the detection accuracy.

Figure 24:
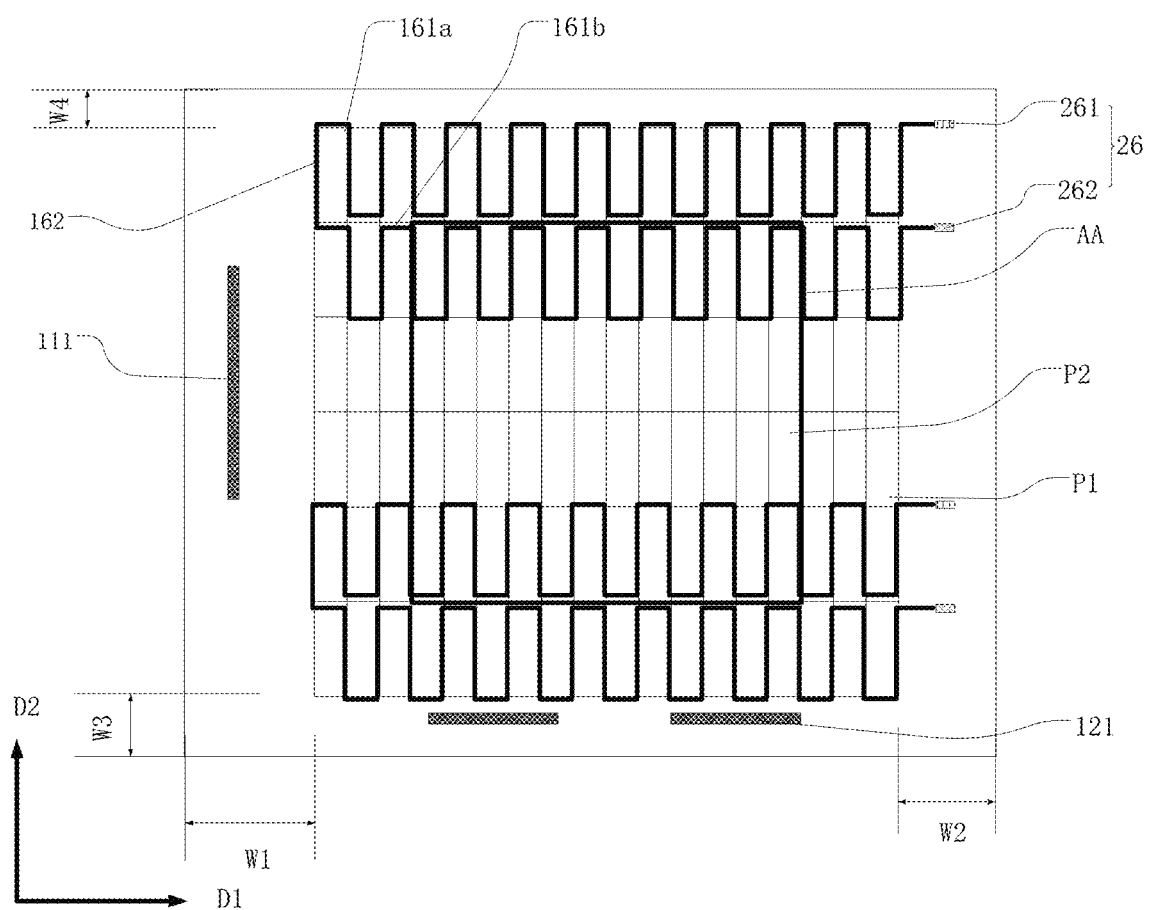
FIG. 24 illustrates a schematic diagram of heating sensors of another liquid crystal display panel consistent with the disclosed embodiments.

FIG. 24 illustrates a schematic diagram of heating sensors of another exemplary liquid crystal display panel. The difference from FIG. 22 is that each of the heating sensors includes two sub-sensors that are electrically connected to each other. The first sub-sensor 161a and the second sub-sensor 161b are electrically connected by a connection sensor 162. The first sensor terminal 261 and the second sensor terminal 262 are disposed in the second region W2. The first sub-sensor 161a and the second sub-sensor 161b are respectively disposed in two adjacent rows of sub-pixel regions. Compared with the display panel shown in FIG. 22, the temperature detection region of the display panel shown in FIG. 23 is larger, and the detection accuracy of the display panel shown in FIG. 23 is higher.

Figure 25:
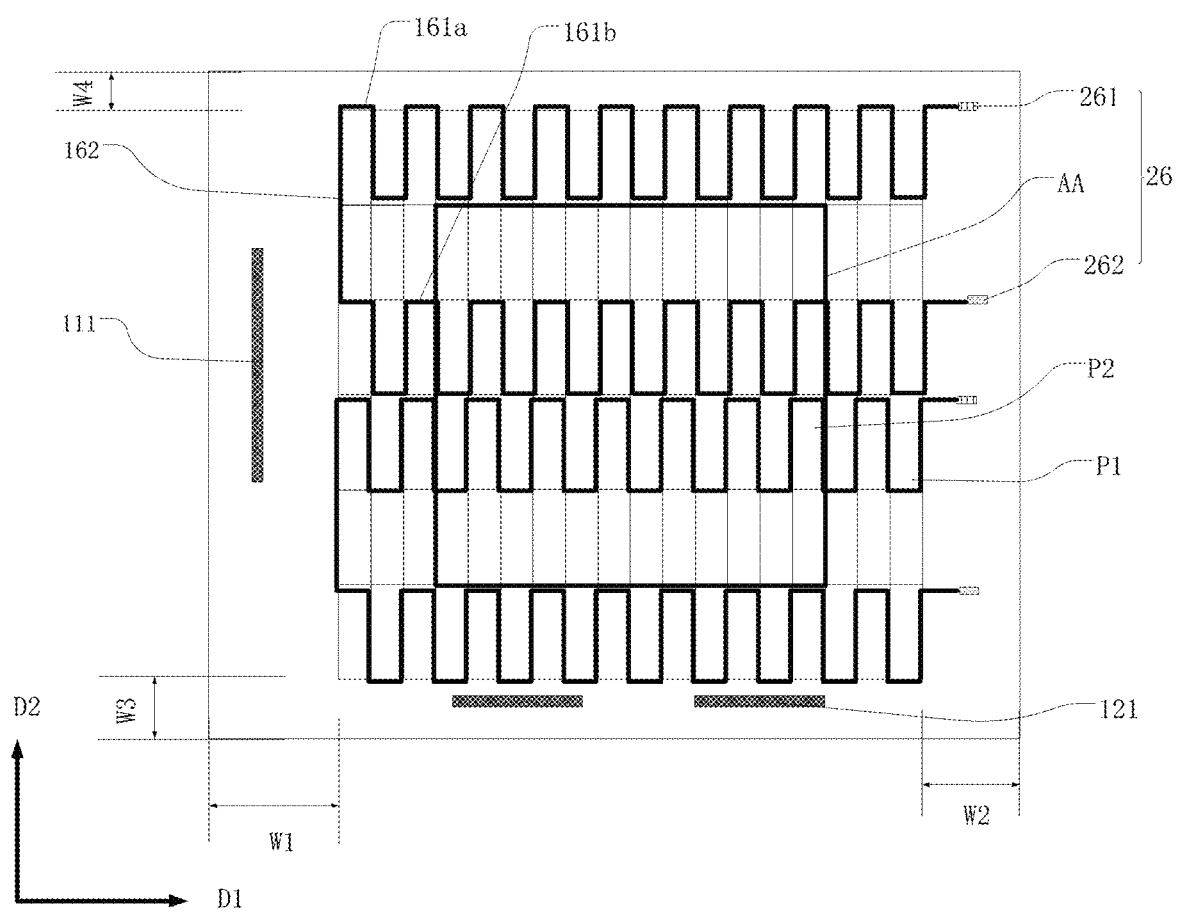
FIG. 25 illustrates a schematic diagram of heating sensors of another liquid crystal display panel consistent with the disclosed embodiments.

FIG. 25 illustrates a schematic diagram of heating sensors of another exemplary liquid crystal display panel. The difference from FIG. 23 is that the first sub-sensor 161a and the second sub-sensor 161b are respectively disposed in regions separated by one row of sub-pixels. That is, if the first sub-sensor 161a is disposed in the first sub-pixel row region, the second sub-sensor 161b is disposed in the third sub-pixel row region. For a whole display panel, such a configuration may have higher detection accuracy.

It should be noted that FIG. 23, FIG. 24 and FIG. 25 are only three embodiments of increasing a length of a heating sensor to increase its resistance for achieving a better detection effect. The present disclosure does not limit numbers, orientations and shapes of concave portions and convex portions in a sub-sensor, and numbers of sub-sensors and heating sensors in a liquid crystal display panel.

Figure 26:
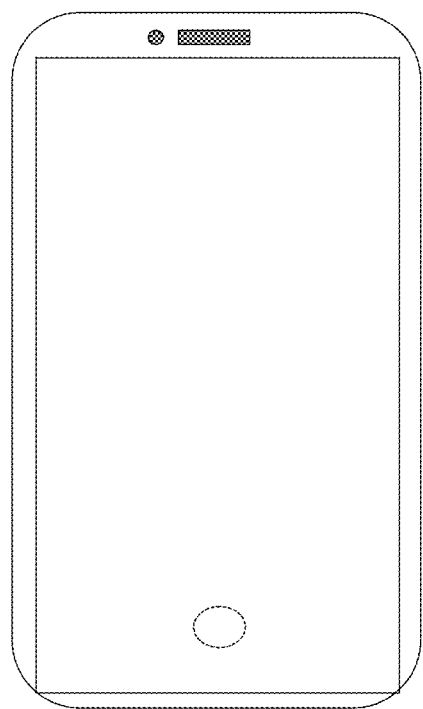
FIG. 26 illustrates a schematic diagram of a liquid crystal display device consistent with the disclosed embodiments.

The present disclosure also provides a liquid crystal display device. The liquid crystal display device may be started and operate normally in a low temperature environment, and temperatures inside the liquid crystal display device may be accurately monitored and adjusted in real time. As shown in FIG. 26, the liquid crystal display device includes a liquid crystal display panel and a casing. The liquid crystal display panel may have one or a combination of the exemplary display panel configurations of the above embodiments. The casing may provide a space for accommodating the display panel. It may be understood that the display device provided by the present disclosure may be a display device having a display function, such as a computer, a television, or an in-vehicle display device. The present disclosure does not limit applications of the display device.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A liquid crystal display panel, comprising:
   a first substrate, including:
      a first base substrate, and
      gate lines and data lines, sequentially disposed on the first base substrate, the gate lines extending along a first direction and arranged along a second direction, the data lines extending along the second direction and arranged along the first direction, the first direction being perpendicular to the second direction, and the gate lines intersecting with and insulated from the data lines, thereby defining a plurality of sub-pixels;
   a second substrate including a second base substrate;
   a liquid crystal layer, located between the first substrate and the second substrate; and
   at least one heating sensor, disposed between the first base substrate and the second base substrate,
   wherein:
      the liquid crystal display panel includes a display area and a non-display area disposed around the display area, the non-display area includes a first non-display area and a second non-display area, the first non-display area is disposed around the display area, and the second non-display area is disposed around the first non-display area;
      the display area and the first non-display area include the plurality of sub-pixels;
      each of the at least one heating sensor includes at least one sub-sensor and two sensor terminals, and the two sensor terminals includes a first sensor terminal and a second sensor terminal;
      the first sensor terminal and the second sensor terminal are respectively connected to two ends of the at least one sub-sensor; and
      at least one of the at least one sub-sensor is disposed in the first non-display area the at least one of the at least one sub-sensor overlapping with a row of sub-pixels of the plurality of sub-pixels.

2. The liquid crystal display panel according to claim 1, wherein:
   the plurality of sub-pixels includes a plurality of display sub-pixels and a plurality of dummy sub-pixels;
   the display area includes the plurality of display sub-pixels, and the first non-display area includes the plurality of dummy sub-pixels;
   in the second substrate, a black matrix is disposed at a location corresponding to the plurality of dummy subpixels, and a vertical projection of the black matrix on the first substrate covers the plurality of dummy sub-pixels; and the plurality of sub-pixels have a same structure.

3. The liquid crystal display panel according to claim 1, wherein:
the second non-display area includes a first region and a second region in the first direction, and the second non-display area includes a third region and a fourth region in the second direction;
each of the at least one sub-sensor includes a plurality of convex portions and a plurality of concave portions in its extending direction, and the convex portions and the concave portions are alternately arranged;
the convex portions and the concave portions are both disposed in a third black matrix region and a fourth black matrix region; and
the third black matrix region refers to a non-transparent area between two adjacent rows of the pixels, and the fourth black matrix area refers to a non-transparent area between two adjacent columns of the pixels.

4. The liquid crystal display panel according to claim 3, wherein the first sensor terminal is disposed in the second region, and the second sub-sensor terminal is disposed in the first region.

5. The liquid crystal display panel according to claim 3, wherein the first sensor terminal and the second sensor terminal are both disposed in the second region.

6. A liquid crystal display panel, comprising:
a first substrate, including:
a first base substrate, and
gate lines and data lines, sequentially disposed on the first base substrate, the gate lines extending along a first direction and arranged along a second direction, the data lines extending along the second direction and arranged along the first direction, the first direction being perpendicular to the second direction, and the gate lines intersecting with and insulated from the data lines, thereby defining a plurality of sub-pixels;
a second substrate including a second base substrate;
a liquid crystal layer, located between the first substrate and the second substrate; and
at least one heating sensor, disposed between the first base substrate and the second base substrate,
wherein:
the liquid crystal display panel includes a display area and a non-display area disposed around the display area, the non-display area includes a first non-display area and a second non-display area, the first non-display area is disposed around the display area, and the second non-display area is disposed around the first non-display area;
each of the at least one heating sensor includes at least one sub-sensor and two sensor terminals, and the two sensor terminals includes a first sensor terminal and a second sensor terminal;
the first sensor terminal and the second sensor terminal are respectively connected to two ends of the at least one sub-sensor;
at least one of the at least one sub-sensor is disposed in the first non-display area;
the plurality of sub-pixels includes a plurality of display sub-pixels and a plurality of dummy sub-pixels;
the display area includes the plurality of display sub-pixels, and the first non-display area includes the plurality of dummy sub-pixels;

in the second substrate, a black matrix is disposed at a location corresponding to the plurality of dummy sub-pixels, and a vertical projection of the black matrix on the first substrate covers the plurality of dummy sub-pixels;
the plurality of sub-pixels have a same structure;
each of the heating sensors also includes two connection portions, and the two connection portions includes a first connection portion and a second connection portion;
one end of the first connection portion is connected to the sub sensor, and the other end of the first connection portion is connected to the first sensor terminal;
one end of the second connection portion is connected to the sub sensor, and the other end of the second connection portion is connected to the second sensor terminal;
the two connection portions are located in the second non-display area; and
electrical resistance of the first connection portion and electrical resistance of the second connection portion are smaller than or equal to one hundredth of electrical resistance of the heating sensor.

7. The liquid crystal display panel according to claim 6, wherein:
the display panel also includes at least one heating electrode located between the first base substrate and the second base substrate;
each of the at least one heating electrode includes at least one sub-electrode;
two ends of each of the at least one heating electrode are connected to a first heating power terminal and a second heating power terminal, respectively;
the at least one heating electrode is formed on the first substrate;
the first heating power terminal and the second heating power terminal are formed on the first substrate; and
the at least one heating sensor is formed on the first substrate.

8. The liquid crystal display panel according to claim 7, wherein:
the second non-display area includes a first region and a second region in the first direction, and the second non-display area includes a third region and a fourth region in the second direction;
the first substrate also includes at least one gate driving circuit and at least one source driving circuit;
the at least one gate driving circuit is located in the first region, and the plurality of gate lines are connected to the gate driving circuit;
the at least one source driving circuit is located in the third region, and the plurality of data lines are connected to the source driving circuit;
heating power terminals, including the first heating power terminal and the second heating power terminal, and the heating sensor terminals are disposed in the second region; and
the gate driving circuit is disposed in the first region.

9. The liquid crystal display panel according to claim 8, wherein:
each of the sub-pixels includes at least one strip electrode, and each of the at least one strip electrode includes a first branch electrode, a second branch electrode, and a bent portion, the bent portion connecting the first branch electrode and the second electrode, the first electrode and the second electrode being symmetrically disposed with respect to the first direction;

each of the at least one heating electrode includes at least two sub-electrodes electrically connected to each other; the at least two sub-electrodes electrically connected to each other include a first sub-electrode and a second sub-electrode, and the first sub-electrode and the second sub-electrode respectively overlap with the bent portion of at least two sub-pixels and extend in the first direction;

one end of the first sub-electrode is electrically connected to the second sub-electrode through a connection electrode extending in a column direction, and the other end of the first sub-electrode is electrically connected to the first heating power terminal;

one end of the second sub-electrode is electrically connected to the first sub-electrode by a connection electrode extending in the column direction, and the other end of the second sub-electrode is electrically connected to the second heating power terminal;

the first sub-electrode overlaps with the bent portion of the x-th row of sub-pixels, and the second sub-electrode overlaps with the bent portion of the (x+1)-th row of sub-pixels, where x is an integer greater than or equal to 1;

each of the at least one heating sensor includes at least two sub-sensors electrically connected to each other, and the at least two sub-sensors electrically connected to each other include a first sub-sensor and a second sub-sensor;

the first sub-sensor and the second sub-sensor respectively extend along the first direction and overlap with the bent portion of at least two sub-pixels;

one end of the first sub-sensor is electrically connected to the second sub-sensor through a connection sensor extending in the column direction, and the other end of the first sub-sensor is electrically connected to the first sensor terminal; and one end of the second sub-sensor is electrically connected to the first sub-sensor through the connection sensor extending in the column direction, and the other end of the second sub-sensor is electrically connected to the second sensor terminal.

10. The liquid crystal display panel according to claim 9, wherein the first sub-sensor overlaps with the bent portion of the x-th row of sub-pixels, and the second sub-sensor overlaps with the bent portion of the (x+1)-th row of sub-pixels, where x is an integer greater than or equal to 1.

11. The liquid crystal display panel according to claim 8, wherein:

each of the at least one heating electrode includes at least two sub-electrodes electrically connected to each other; the at least two sub-electrodes electrically connected to each other include a first sub-electrode and a second sub-electrode, and the first sub-electrode and the second sub-electrode are respectively disposed in a first black matrix region extending in the first direction; the first black matrix region refer to a non-transparent region between two adjacent rows of pixels;

one end of the first sub-electrode is electrically connected to the second sub-electrode through a connection electrode extending in a column direction, and the other end of the first sub-electrode is electrically connected to the first heating power terminal;

one end of the second sub-electrode is electrically connected to the first sub-electrode through the connection electrode extending in the column direction, and the other end of the second sub-electrode is electrically connected to the second heating power terminal;

the first sub-electrode extends along the first black matrix region between an x'-th row of the sub-pixels and an (x'−1)-th row of the sub-pixels in the first direction, and the second sub-electrode extends along the first black matrix region between the x'-th row of the sub-pixels and the (x'+1)-th row of sub-pixels in the first direction, where x' is an integer greater than or equal to 1;

each of the at least one heating sensor includes at least two sub-sensors electrically connected to each other, and the at least two sub-sensors electrically connected to each other include a first sub-sensor and a second sub-sensor;

the first sub-sensor and the second sub-sensor are respectively disposed in the first black matrix region extending in the first direction;

one end of the first sub-sensor is electrically connected to the second sub-sensor through a connection sensor extending in the column direction, and the other end of the first sub-sensor is electrically connected to the first sensor terminal; and one end of the second sub-sensor is electrically connected to the first sub-sensor by the connection sensor extending in the column direction, and the other end of the second sub-sensor is electrically connected to the second sensor terminal.

12. The liquid crystal display panel according to claim 11, wherein the first sub-sensor extends along a first black matrix region between the x-th row of sub-pixels and the (x−1)-th row of subpixels in the first direction, and the second sub-sensor extends along a first black matrix region between the x'-th row of sub-pixels and the (x'+1)-th row of sub-pixels in the first direction, where x' is an integer greater than or equal to 1.

13. The liquid crystal display panel according to claim 11, wherein both the first sub-sensor and the second sub-sensor overlap with the bent portion of the x-th row of sub-pixels, where x is an integer greater than or equal to 1.

14. The liquid crystal display panel according to claim 13, wherein:

the display panel also includes at least one heating sensor; the at least one heating sensor includes at least two sub-sensors electrically connected to each other, and the at least two sub-sensors electrically connected to each other include a first sub-sensor and a second sub-sensor;

in the first direction, the first sub-sensor and the second sub-sensor respectively extend along a first black matrix region, and the first black matrix region is located between a row of the dummy pixels and a row of the display pixels;

one end of the first sub-sensor is electrically connected to the second sub-sensor through a connection sensor extending in the column direction, and the other end of the first sub-sensor is electrically connected to the first sensor terminal; and one end of the second sub-sensor is electrically connected to the first sub-sensor by the connection sensor extending in the column direction, and the other end of the second sub-sensor is electrically connected to the second sensor terminal.

15. The liquid crystal display panel according to claim 11, wherein both the first sub-sensor and the second sub-sensor extend along the first black matrix region in the first direction, and the first black matrix region is located between the x'-th row of sub-pixels and the (x'+1)-th row of sub-pixels, where x' is an integer greater than or equal to 1.

16. The liquid crystal display panel according to claim 7, wherein:
   the second non-display area includes a first region and a second region in the first direction, and the second non-display area includes a third region and a fourth region in the second direction;
   the first substrate also includes at least one gate driving circuit and at least one source driving circuit; the at least one gate driving circuit is located in the first region, and the gate lines are connected to the gate driving circuit; and the at least one source driving circuit is located in the third region, and the data lines are connected to the source driving circuit;
   the first heating power terminal is located in the second region, and the second heating power terminal is located in the first region;
   each of the at least one heating electrode includes only one sub-electrode overlapping with the bent portion of a row of the sub-pixels; and
   two ends of the sub-electrode are electrically connected to the first heating power terminal and the second heating power terminal, respectively.

17. The liquid crystal display panel according to claim 7, wherein
   the second non-display area includes a first region and a second region in the first direction, and the second non-display area includes a third region and a fourth region in the second direction;
   the first substrate also includes at least one gate driving circuit and at least one source driving circuit; the at least one gate driving circuit is located in the first region, and the gate lines are connected to the gate driving circuit; and the at least one source driving circuit is located in the third region, and the data lines are connected to the source driving circuit;
   the first sensor terminal is located in the second region, and the second sensor terminal is located in the first region;
   each of the at least one heating sensor includes only one sub-sensor overlapping with the bent portion of a row of the sub-pixels; and
   two ends of the sub-sensor are electrically connected to the first sensor terminal and the second sensor terminal, respectively.

18. The liquid crystal display panel according to claim 7, wherein:
   the second non-display area includes a first region and a second region in the first direction, and the second non-display area includes a third region and a fourth region in the second direction;
   the first substrate also includes at least one gate driving circuit and at least one source driving circuit; the at least one gate driving circuit is located in the first region, and the gate lines are connected to the gate driving circuit; and the at least one source driving circuit is located in the third region, and the data lines are connected to the source driving circuit; and
   the heating power terminals and the sensor terminals are located in the fourth region.

19. The liquid crystal display panel according to claim 18, wherein:
   each of the at least one heating electrode includes at least two sub-electrodes electrically connected to each other, and the at least two sub-electrodes electrically connected to each other include a first sub-electrode and a second sub-electrode;
   the first sub-electrode and the second sub-electrode are respectively disposed on a second black matrix region extending in the second direction, and the second black matrix region refers to a non-transparent region between two adjacent columns of pixels;
   one end of the first sub-electrode is electrically connected to the second sub-electrode through a connection electrode extending in the row direction, and the other end of the first sub-electrode is electrically connected to the first heating power terminal;
   one end of the second sub-electrode is electrically connected to the first sub-electrode through the connection electrode extending in the row direction, and the other end of the second sub-electrode is electrically connected to the second heating power terminal;
   each of the at least one heating sensor includes at least two sub-sensors electrically connected to each other, and the at least two sub-sensors electrically connected to each other include a first sub-sensor and a second sub-sensor; the first sub-sensor and the second sub-sensor are respectively disposed in a second black matrix region extending in the second direction;
   one end of the first sub-sensor is electrically connected to the second sub-sensor through a connection sensor extending in the row direction, and the other end of the first sub-sensor is electrically connected to the first sensor terminal; and
   one end of the second sub-sensor is electrically connected to the first sub-sensor through the connection sensor extending in the row direction, and the other end of the second sub-sensor is electrically connected to the second sensor terminal.

20. A liquid crystal display device, comprising a liquid crystal display panel comprising:
   a first substrate, including:
      a first base substrate, and
      gate lines and data lines, sequentially disposed on the first base substrate, the gate lines extending along a first direction and arranged along a second direction, the data lines extending along the second direction and arranged along the first direction, the first direction being perpendicular to the second direction, and the gate lines intersecting with and insulated from the data lines, thereby defining a plurality of sub-pixels;
   a second substrate including a second base substrate;
   a liquid crystal layer, located between the first substrate and the second substrate; and
   at least one heating sensor, disposed between the first base substrate and the second base substrate,
   wherein:
      the liquid crystal display panel includes a display area and a non-display area disposed around the display area, the non-display area includes a first non-display area and a second non-display area, the first non-display area is disposed around the display area, and the second non-display area is disposed around the first non-display area;
      the display area and the first non-display area include the plurality of sub-pixels;
      each of the at least one heating sensor includes at least one sub-sensor and two sensor terminals, and the two sensor terminals includes a first sensor terminal and a second sensor terminal;
      the first sensor terminal and the second sensor terminal are respectively connected to two ends of the at least one sub-sensor; and at least one of the at least one sub-sensor is disposed in the first non-display area the at least one of the at least one sub-sensor overlapping with a row of sub-pixels of the plurality of sub-pixels.

* * * * *